United States Patent [19]
Lipscomb et al.

[11] Patent Number: 5,912,670
[45] Date of Patent: Jun. 15, 1999

[54] METHOD AND APPARATUS FOR OVERLAYING A BIT MAP IMAGE ON AN ENVIRONMENT MAP

[75] Inventors: James S. Lipscomb; William Louis Luken, both of Yorktown Heights; Jai P. Menon, Peekskill; Bengt-Olaf Schneider, Yorktown Heights, all of N.Y.

[73] Assignee: International Business Machines Corporation, Armonk, N.Y.

[21] Appl. No.: 08/723,970

[22] Filed: Sep. 27, 1996

Related U.S. Application Data

[60] Provisional application No. 60/023,143, Aug. 5, 1996, provisional application No. 60/022,428, Aug. 5, 1996, and provisional application No. 60/022,424, Aug. 5, 1996.

[51] Int. Cl.$^6$ .................................................. G06T 17/00
[52] U.S. Cl. ............................ 345/419; 345/435; 345/427
[58] Field of Search .................................. 345/419, 427, 345/435

[56] References Cited

U.S. PATENT DOCUMENTS

| | | | |
|---|---|---|---|
| 5,388,192 | 2/1995 | Ohsawa et al. | 345/435 |
| 5,396,583 | 3/1995 | Chen et al. | 345/427 |
| 5,561,756 | 10/1996 | Miller et al. | 395/155 |
| 5,594,845 | 1/1997 | Florent et al. | 395/127 |

FOREIGN PATENT DOCUMENTS

| | | |
|---|---|---|
| 2298769 | 9/1996 | European Pat. Off. . |

OTHER PUBLICATIONS

QuickTime VR—An Image–Based Approach to Virtual Environment Navigation, Shenchang Eric Chen, Apple Computer, Inc., Siggraph, Computer Graphics Proceedings, Annual Conference Series, 1995, pp. 29–38.

*Primary Examiner*—Phu K. Nguyen
*Assistant Examiner*—Huedung X. Cao
*Attorney, Agent, or Firm*—Jay P. Sbrollini; Perman & Green, LLP

[57] ABSTRACT

The computer system of the present invention generates a view of a scene by storing in memory color values associated with elements of an environment map representing the scene and color values associated with elements of a bit map image that is separate from the environment map. The bit map image is orientated with respect to the coordinate system of the environment map. The environment map is projected onto a view window that comprises an array of pixels. For at least one pixel of the view window covered by the bit map image, the element of the bit map image that corresponds to the pixel of the view plane is determined and a color value of the pixel is derived based upon the color value of the corresponding element of the bit map image. The derived color value of the pixel of the view window is stored for display. The computer system may also store in memory depth values associated with the elements of the bit map image and depth values associated with pixels of the view window. In this scenario, when the depth value associated with the pixel and a depth value associated with the element indicate that the element of the bit map image is nearer to the view point than the pixel of the view window, the computer system derives a color value of the pixel of the view window based upon color value of the corresponding element of the bit map image and stores the derived color value of the pixel for display.

12 Claims, 33 Drawing Sheets

METHOD AND APPARATUS FOR OVERLAYING A BIT MAP IMAGE ON AN ENVIRONMENT MAP

The present application is related to U.S. patent application Ser. No. 60/023,143, U.S. patent application Ser. No. 60/022,428, and U.S. patent application Ser. No. 60/022,424, all filed on Aug. 5, 1996 and assigned to the common assignee of the present invention, herein incorporated by reference in their entirety.

BACKGROUND OF THE INVENTION

1. Technical Field

The invention relates generally to image processing systems, and, more particularly, to image processing systems that allow a user to create and view panoramic three dimensional images from data representing multiple views of a scene.

2. Description of the Related Art

Conventional three dimensional graphics applications and associated hardware render scenes composed of one or more three dimensional objects. The objects are typically represented by geometric primitives, for example triangles. The objects are represented by graphics data that represent the position and color of primitives in a model coordinate system. The graphics system renders the scene to display those object(s) of the scene that are visible in a viewing window based upon a view point. The user can navigate through the scene by changing the position and orientation of a view point reference (camera). In addition, animations can be performed by navigating through a series of preselected positions and orientations of the view point reference.

The rendering operation is a computationally intensive process and, thus, typically performed by specialized graphics hardware. Such systems are powerful yet remain costly due to the need for specialized hardware dedicated to this purpose.

Moreover, conventional three dimensional graphics systems require that the user provide a three-dimensional model of the scene (i.e., graphics data that represents the position and color of the geometric primitives of the scene in the model coordinate system). Such models may be created with software in conjunction with peripheral devices (pen tablets, scanners, cameras, etc). For example the software sold under the name CATIA by Daussault of France allows a user to build a three-dimensional model of a scene. However, such modeling software is expensive and, in addition, a significant investment in labor may be required to model even a relatively uncomplicated scene.

Because of the high costs associated with conventional three dimensional graphics systems, alternative solutions have emerged that provide effective yet limited capabilities in creating and viewing a three dimensional scene which are suitable for use on standard personal computers and without the need for dedicated graphics hardware. One such solution is the software developed and sold by Apple Computer, Inc. of Cupertino, Calif. under the name QuicktimeVR. The QuicktimeVR software is segmented into two distinct packages. The first package, which is sold to content providers, is an authoring tool that allows content providers to develop a panoramic three-dimensional image from multiple views of a scene. The second package is a viewer which is distributed to consumers and which allows the consumer to view the panoramic three-dimensional images created by the authoring tool. A more detailed description of the operation of the QuicktimeVR system may be found in Chen, "Quicktime® VR—An Image-based Approach to Virtual Environment Navigation", SIGGRAPH 1995, Los Angeles, Calif., pp. 29–38, and in U.S. Pat. No. 5,396,583 to Chen et al., which is assigned to Apple Computer, Inc.

The QuicktimeVR system utilizes a cylindrical environment map to represent the panoramic view of a scene (or collection of images). Different perspective views are rendered by mapping the cylindrical environment map to a desired viewing window. However, one of the limitations of the QuicktimeVR system is that the system does not have capability of integrating bit map images that are separate from the cylindrical environment map into the panoramic scene.

Thus, there is a need in the art to provide for a cost effective system for generating and viewing three dimensional panoramic images that provide for the integration of bit map images into the panoramic image.

SUMMARY OF THE INVENTION

The above-stated problems and related problems of the prior art are solved with the principles of the present invention, method and apparatus for overlaying a bit map image on an environment map, which generates a view of a scene by storing in memory color values associated with elements of an environment map representing the scene and color values associated with elements of a bit map image that is separate from the environment map. The bit map image is orientated with respect to the coordinate system of the environment map. The environment map is projected onto a view window that comprises an array of pixels. For at least one pixel of the view window covered by the bit map image, the element of the bit map image that corresponds to the pixel of the view plane is determined and a color value of the pixel is derived based upon the color value of the corresponding element of the bit map image. The derived color value of the pixel of the view window is stored for display.

The present invention may also store in memory depth values associated with the elements of the bit map image and depth values associated with pixels of the view window. In this scenario, when the depth value associated with the pixel and a depth value associated with the element indicate that the element of the bit map image is nearer to the view point than the pixel of the view window, the color value of the pixel of the view window is derived from the color value of the corresponding element of the bit map image, and the derived color value of the pixel is stored for display.

DETAILED DESCRIPTION OF THE PRESENT INVENTION

A method and apparatus for generating panoramic scenes from a cylindrical environment map that includes data defining top and/or bottom portions of the cylindrical environment is set forth herein.

The data representing the top and bottom images may divided into two parts based on circles determined by a minimum and maximum elevation angles, respectively. That is, the top image may be divided into two regions based on a circle determined by a maximum elevation angle, and the bottom image may be divided into two regions based on a circle determined by a minimum elevation angle. The minimum and maximum elevations angles may be determined, for example, by the elevation angles corresponding the top and bottom edges of the centers of the side images. Image data values in the regions of the top and bottom images lying outside these circles may be mapped onto the cylindrical environment map, filling the regions denoted by X and * in FIG. 12 as well as additional area beyond the top and bottom of FIG. 12, thereby extending the vertical elevation values accessible with a cylindrical environment map. A more detailed description the integration of the top and/or bottom images into a cylindrical environment map is set forth below The amount of data required to store the portions of a cylindrical environment map increases in proportion to the tangents of the maximum and minimum elevation maps, and this can become impractical for minimum and maximum elevation angles exceeding 60 degrees or so. In the absence of top and/or bottom images, such extension to the range of elevations values is not possible.

Image data values in the regions of the top and bottom images lying inside these circles need not be mapped onto the cylindrical environment map. Instead, these data values may be accessed during the image projection process to further extend the range of elevation values which may be supported by the means used to visualize the data represented by the cylindrical environment map. That is, the color values for any pixels in a projected image corresponding to elevation values beyond the maximum or minimum elevation values may be derived directly from the interior of the circular regions of the top and/or bottom images determined by said minimum and maximum elevation angles. In the absence of top and bottom images, projected images dependent on such extended elevation values cannot be produced.

Figure 1:
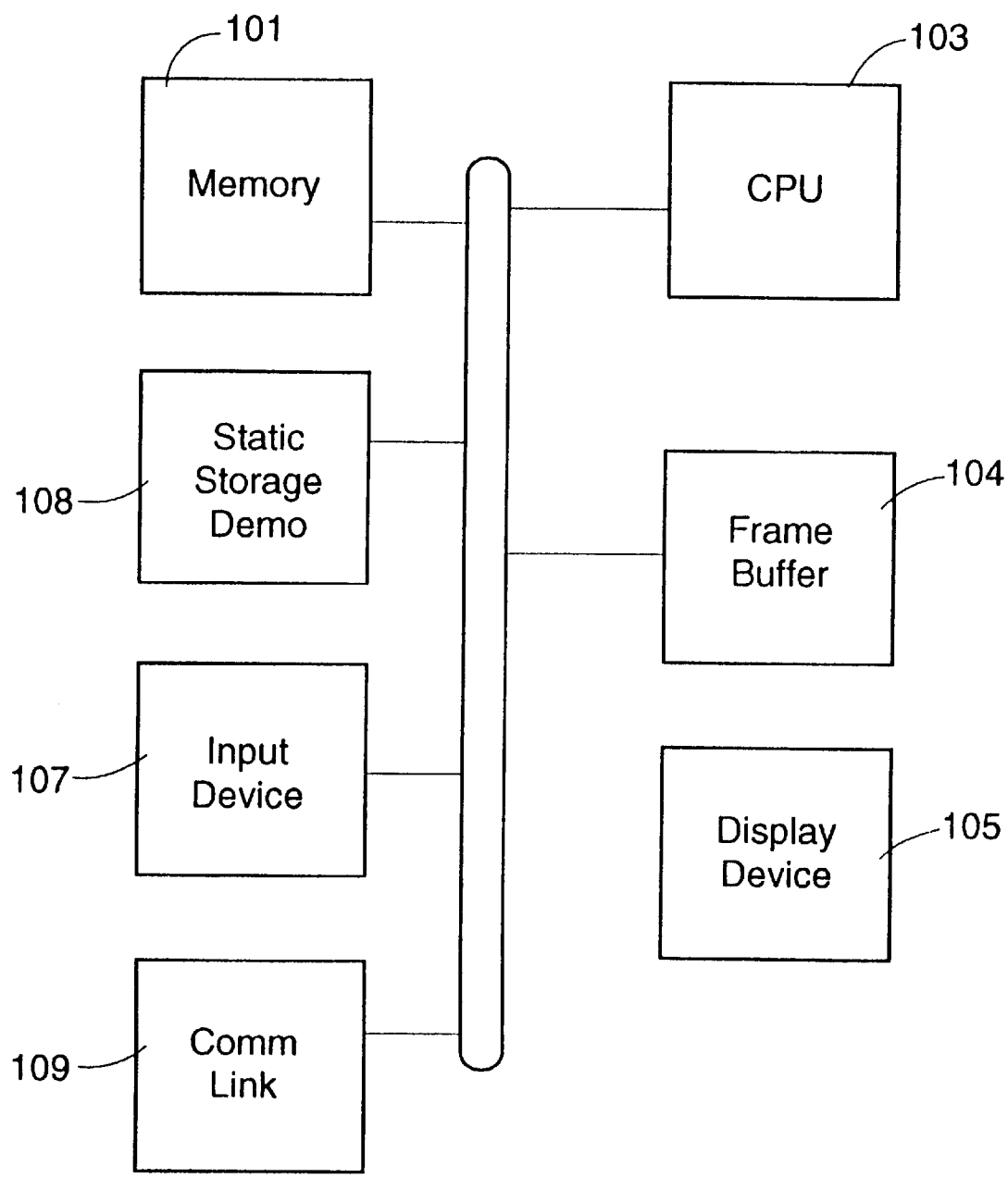
FIG. 1 is a functional block diagram of a computer processing system that may be utilized by the preferred embodiment of the present invention.

The present invention may be implemented on any computer processing system including, for example, a personal computer, a workstation, or a graphics adapter that works in conjunction with a personal computer or workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the non-volatile storage device 108 and/or memory 101.

In addition, the computer processing system includes a frame buyer 104 coupled between the CPU 103 and a display device 105 such as a CRT display or LCD display. The frame buffer 104 contains pixel data for driving the display device 105. In some systems, a rendering device (not shown), also known as a graphics accelerator, may be coupled between the CPU 103 and the frame buffer 104.

In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s).

It should be noted that the application program(s) executed by the CPU 103 may perform the rendering methods of the present invention described below. Alternatively, portions or all of the rendering methods described below may be embodied in hardware that works in conjunction with the application program executed by the CPU 103.

What will now be described is the cylindrical environment map that includes data defining top and/or bottom portions of the cylindrical environment and techniques for rendering views of such cylindrical environment maps.

A cylindrical environment map is composed of a rectangular array of elements or pixels wherein each pixel includes data representative of the portion of a three dimensional scene contained within the narrow pyramid defined by the origin of the axis of a cylinder and a rectangular area on the surface of the cylinder.

Figure 2:
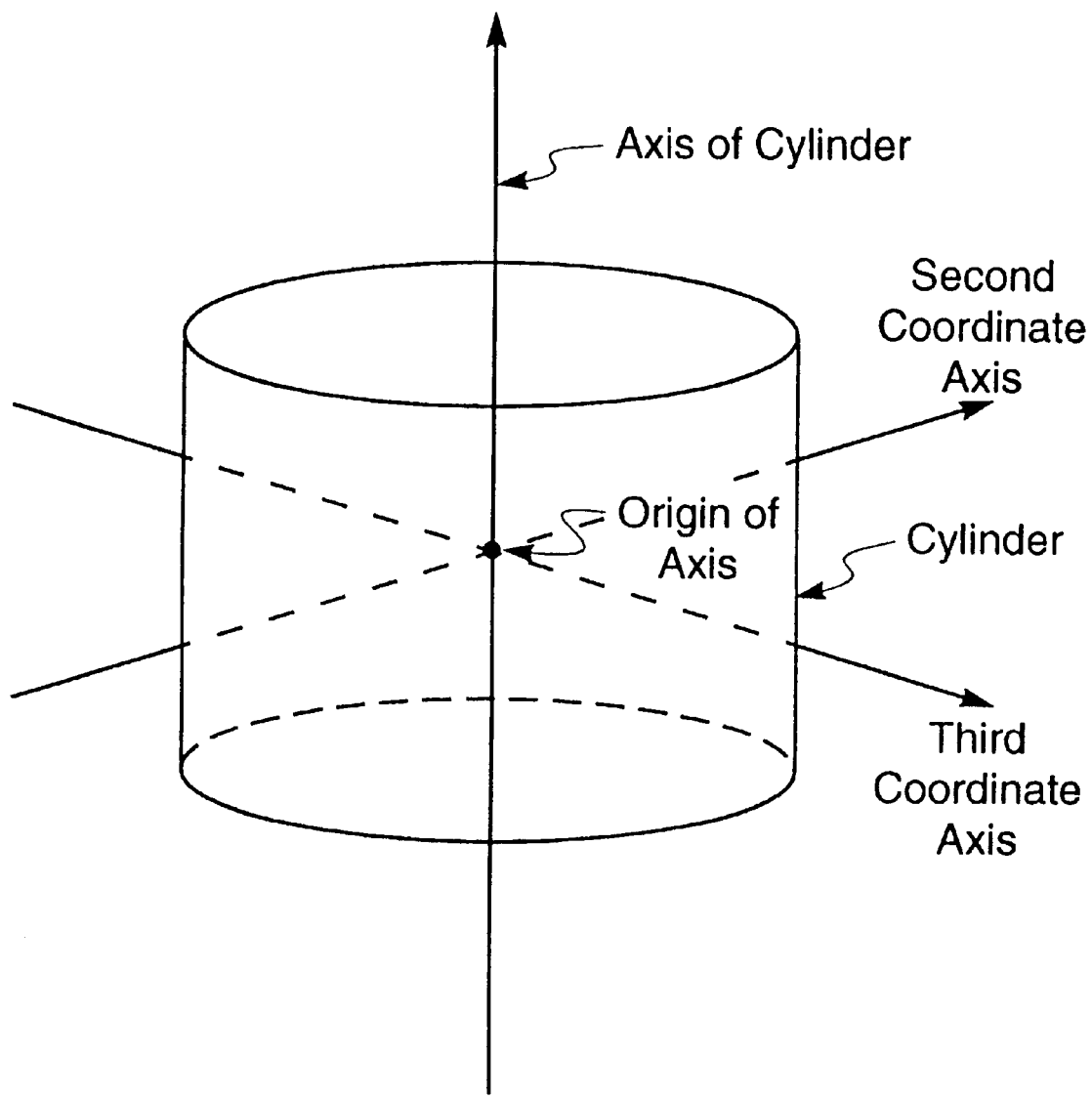
FIG. 2 illustrates the cylinder, axis of the cylinder, origin of the axis and third coordinate axis of a cylindrical environment map.

FIG. 2 illustrates a cylinder, the axis of the cylinder, and the origin of the axis of the cylinder. The second coordinate axis is determined by a line which is perpendicular to the axis of the cylinder and which passes through the origin of the cylinder. The third coordinate axis is determined by a line which is perpendicular to both the axis of the cylinder and the second coordinate axis, and which also passes through the origin of the axis of the cylinder. Any point in the plane determined by the second and third coordinate axes is defined as having an elevation of zero. The elevation of any other point is defined by the distance to the plane determined by the second and third coordinate axes, with positive elevations assigned to points above this plane, and negative elevations being assigned to points on the opposite side of this plane.

Figure 3:
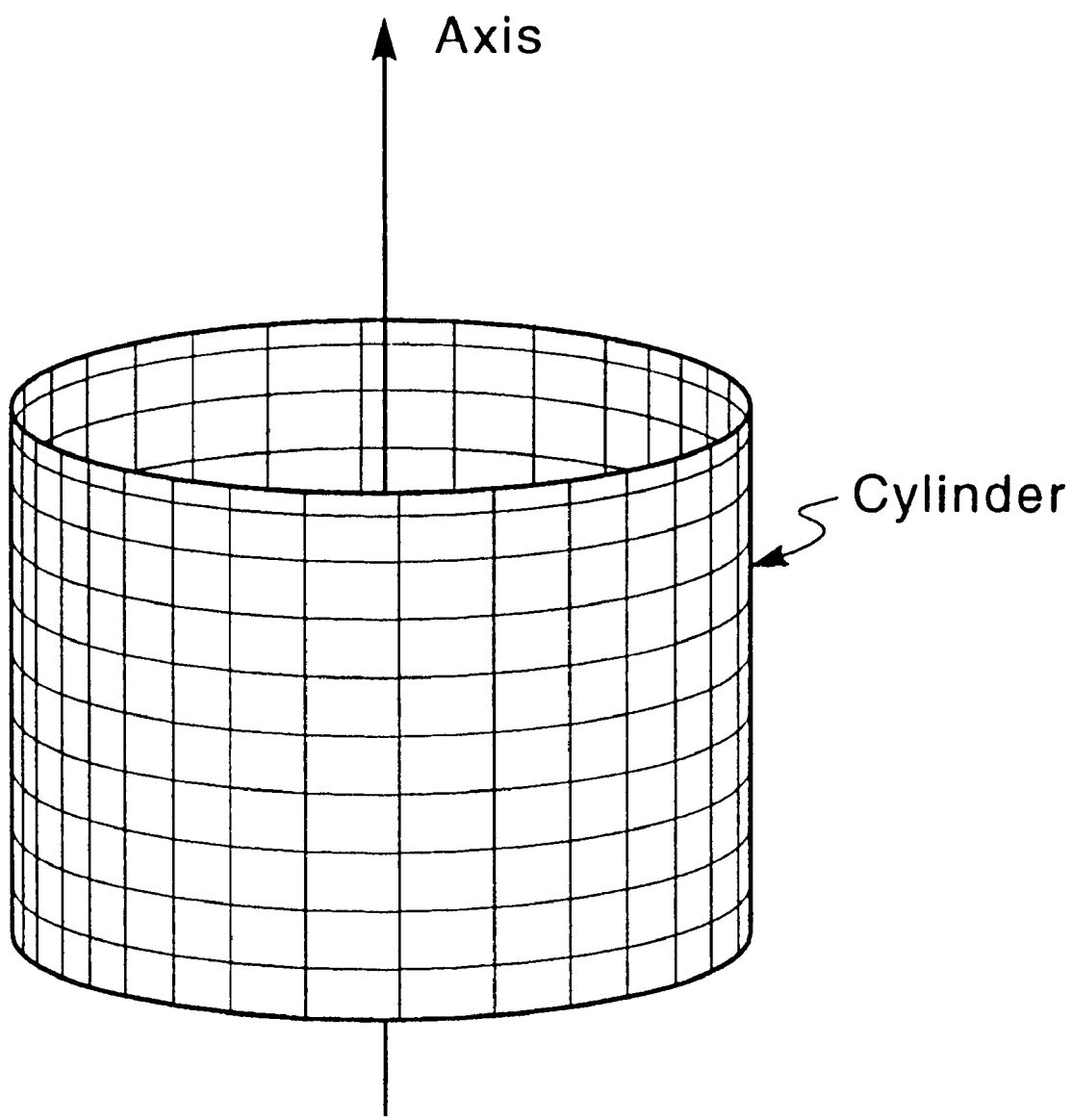
FIG. 3 illustrates the division of the cylinder of FIG. 2 into rectangular area.

FIG. 3 illustrates how a cylinder may be divided into many rectangular areas. The boundaries of these areas are formed by vertical lines parallel to the axis of the cylinder and circles perpendicular to this axis. These areas correspond to planar rectangles when the cylinder is unrolled to form a large planar rectangle. A given rectangular area of the cylinder is designated by a unique row and column number associated with the side image. The number of rows in the cylinder is designated below as panWdt, and the number of columns in the cylinder is designated below as PanHgt.

Figure 4:
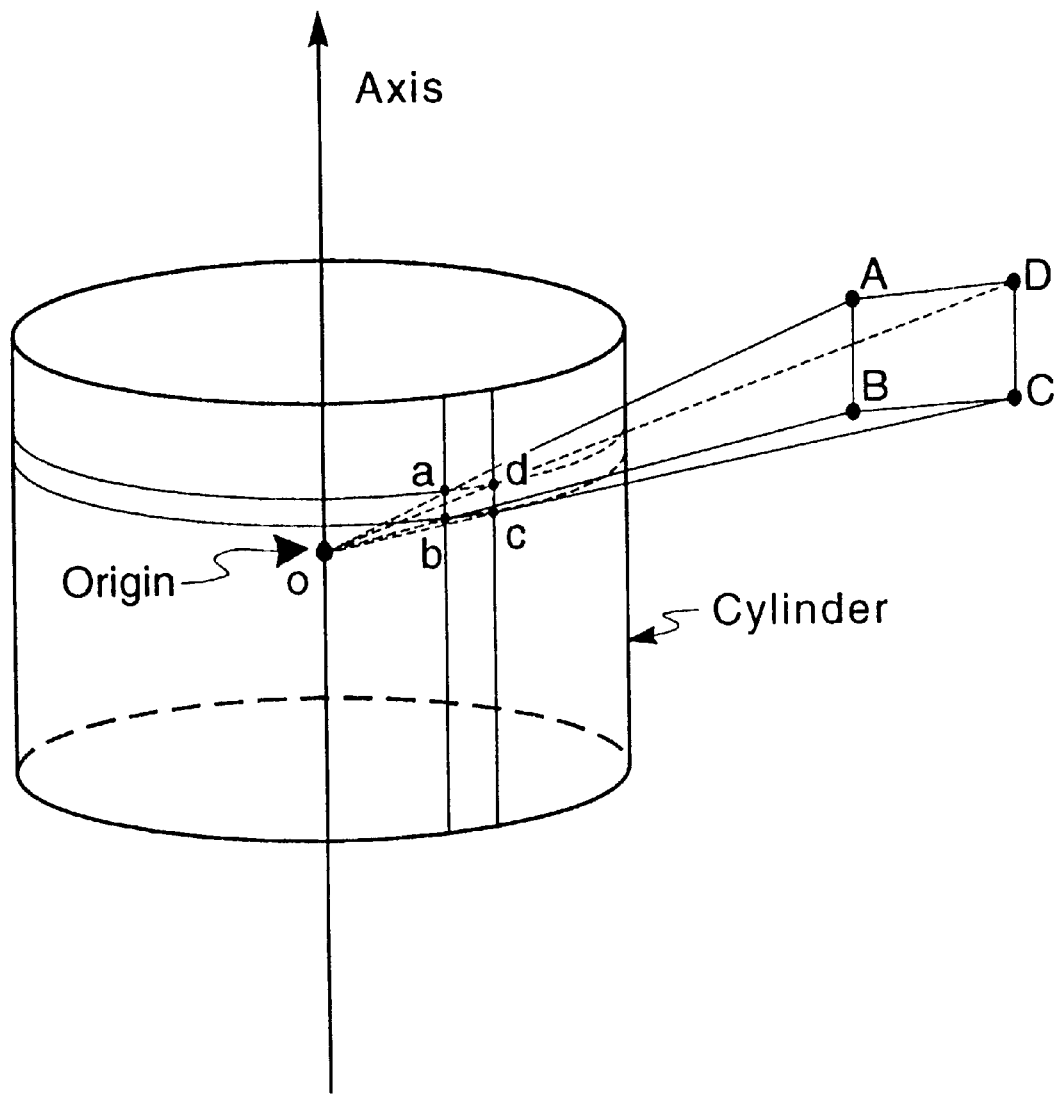
FIG. 4 illustrates a pyramidal volume (OABCD) defined by the origin (O) of the cylinder and a rectangular area (abcd) of FIG. 3.

FIG. 4 illustrates a pyramidal region determined by a single rectangular area (abcd) on the side of a cylinder and the origin of the cylinder. The base (ABCD) of the pyramid may be located an infinite distance from rectangular area (abcd). The color value associated with rectangular area (abcd) is determined by the three dimensional objects which intersect this pyramid and are visible from the origin (o) of the cylinder. En a computer generated image, the color associated with rectangular area (abcd) may be approximated by the color determined by the line starting at the origin (o) and passing through the center of the base (ABCD) of the pyramid. Other values may also be associated with area (abcd). For example, a depth value may be defined by the distance from the origin to the nearest point intersecting the line from the origin (o) through the center of the base (ABCD) of the pyramid. Alternatively, an index into a table of responses may also be associated with area (abcd). Each entry in a table of responses may define an action to be performed when the corresponding area (abcd) is selected.

The cylindrical environment map may be created by digitizing a panoramic photograph obtained from a panoramic camera in which a narrow vertical slit is used to expose photographic film as the lens and slit rotate about a vertical axis. Alternatively, multiple flat images may be projected onto the surface of a cylinder to create the cylindrical environment map. Each of the flat images may be obtained by digitizing a conventional photograph captured on a flat or planar area of photographic film, or through application of computer graphics rendering algorithms to a three dimensional digital model. In either case, each flat image may be characterized by a horizontal field of view and a vertical field of view. If the sum of the horizontal fields of view is equal to 360 degrees, then the cylindrical environment map is defined as being complete. If the sum of the horizontal fields of view is less than 360 degrees, then the cylindrical environment map is defined as a partial panorama.

According to the present invention, the image data of the cylindrical environment map is preferably stored in column order. It is a common practice to store the image data in row order. That is, the data representative of an image having nCol columns and nRow rows is typically stored as a sequence of nRow contiguous blocks of data each containing the data for nCol contiguous pixels representing a horizontal band across the image, the data for successive rows being stored in sequence from top to bottom or from bottom to top. In this case, the number of rows is a measure of the height of the image and the number of columns is a measure of the width of the image. A panoramic image based on a cylindrical projection typically has many more columns than rows. The number of columns in a panoramic image may exceed the number of rows by a factor of 4 to 5 or more. A projected image representing a view of the scene represented by the panoramic image depends on a certain subset of the rows and columns in the panoramic image. This subset may include, for example, one half to all the rows and 1/10 to 1/4 of the columns. In this case, the conventional row-ordered storage of image data leads to very inefficient memory reference patterns when computing the projected image, where the projected image depends on a small part of each row.

The memory reference patterns needed to compute a projected image can be made more efficient by storing the panoramic image in column order instead of row order. In this case, the same data representative of the panoramic image is stored as a sequence of nCol contiguous blocks each containing the data for nRow contiguous pixels. Each such block contains the data for one column of the panoramic image, and the blocks representative of successive columns are stored in sequence of increasing azimuth. In this case, the "width" of the image data (the number of elements per block) becomes a measure of the vertical size of the image, and the "height" (number of data blocks) becomes a measure of the horizontal size of the panoramic image.

The storage of a panoramic image in column order also benefits the calculation of the projected image in column order even though the projected image itself is stored in row order. In this case, the elements of the larger data structure (the panoramic image) are accessed sequentially, and certain operations such as trigonometric functions of the azimuth need be calculated only once per column. The cylindrical environment map of the present invention as set forth below is described in column order wherein the width of the image is a measure of the vertical size of the image, and the height of the image is a measure of the horizontal size of the image.

Given a partial or complete cylindrical environment map, it is possible to generate images of the corresponding three dimensional scene by projecting elements of the cylindrical environment map onto a plane parallel to the axis of the cylinder. The portion of the cylindrical environment map projected onto this plane may be characterized by the azimuth angle δ and elevation z of the center of the projected image, as well as by the horizontal and vertical field of view angles α and β, respectively.

Figure 5:
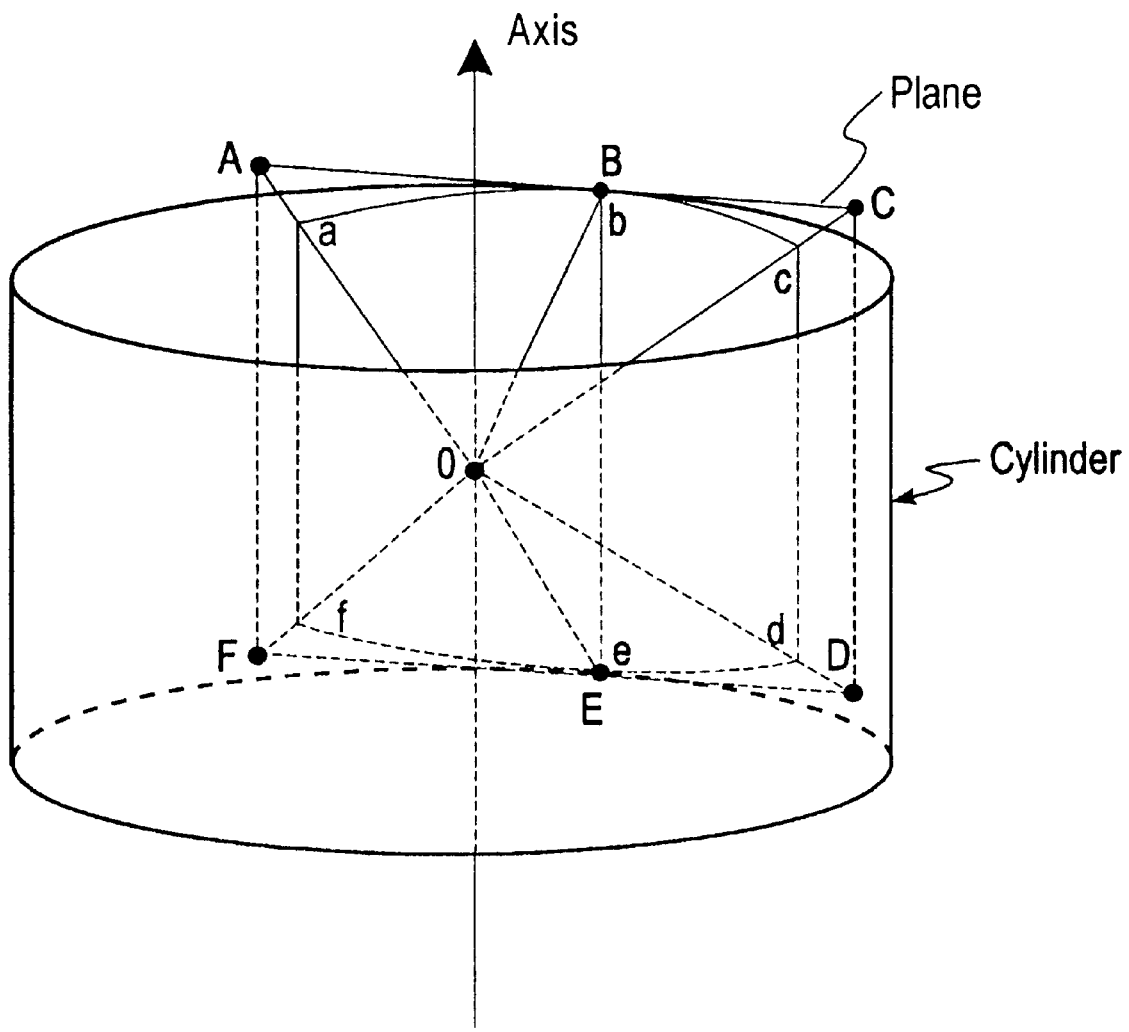
FIG. 5 illustrates the projection of a portion (abcdef) of the cylinder of FIG. 2 onto a plane (ABCDEF) parallel to the axis of the cylinder.

The projection of a portion of a cylinder onto a plane (or the reverse) is illustrated in FIG. 5. Points A, C, D, and F represent the corners of a planar rectangle parallel to the axis of the cylinder. Point B is the midpoint of edge (AC) and point E is the midpoint of edge (DF).

Rectangle (ACDF) is tangent to the cylinder along line (BE=be). Points (a, b, c, d, e, and f) represent points on the cylinder defined by the intersections of straight lines from the origin (o) to points (A, B, C, D, E, and F) on the planar rectangle.

Figure 6:
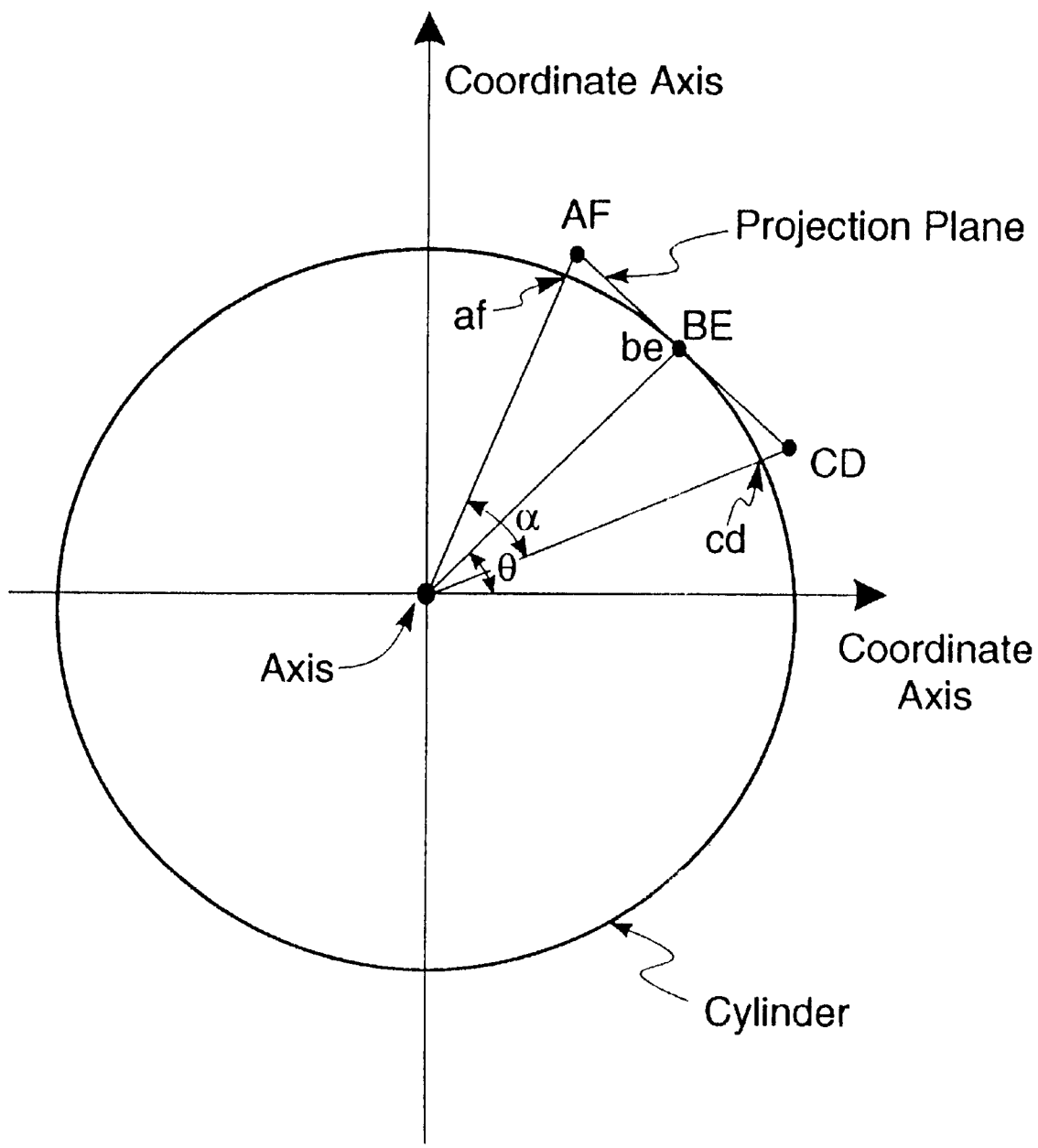
FIG. 6 is a view of the cylinder and projection plane of FIG. 5 as seen looking down the axis of the cylinder.

FIG. 6 shows the same cylinder and plane illustrated in FIG. 5 as viewed looking down the axis of the cylinder. In this view, points A, E, C, a, b, and c coincide with points F, E, D, f, e, and d respectively. The azimuth of line (BE=be) is indicated by the angle δ. The horizontal field of view angle α is determined by the difference between the azimuth of line (af) and the azimuth of line (cd). (Lines (af), (be), and (cd) appear as points in this figure because these lines are all parallel to the axis of the cylinder (and direction of view).

Figure 7:
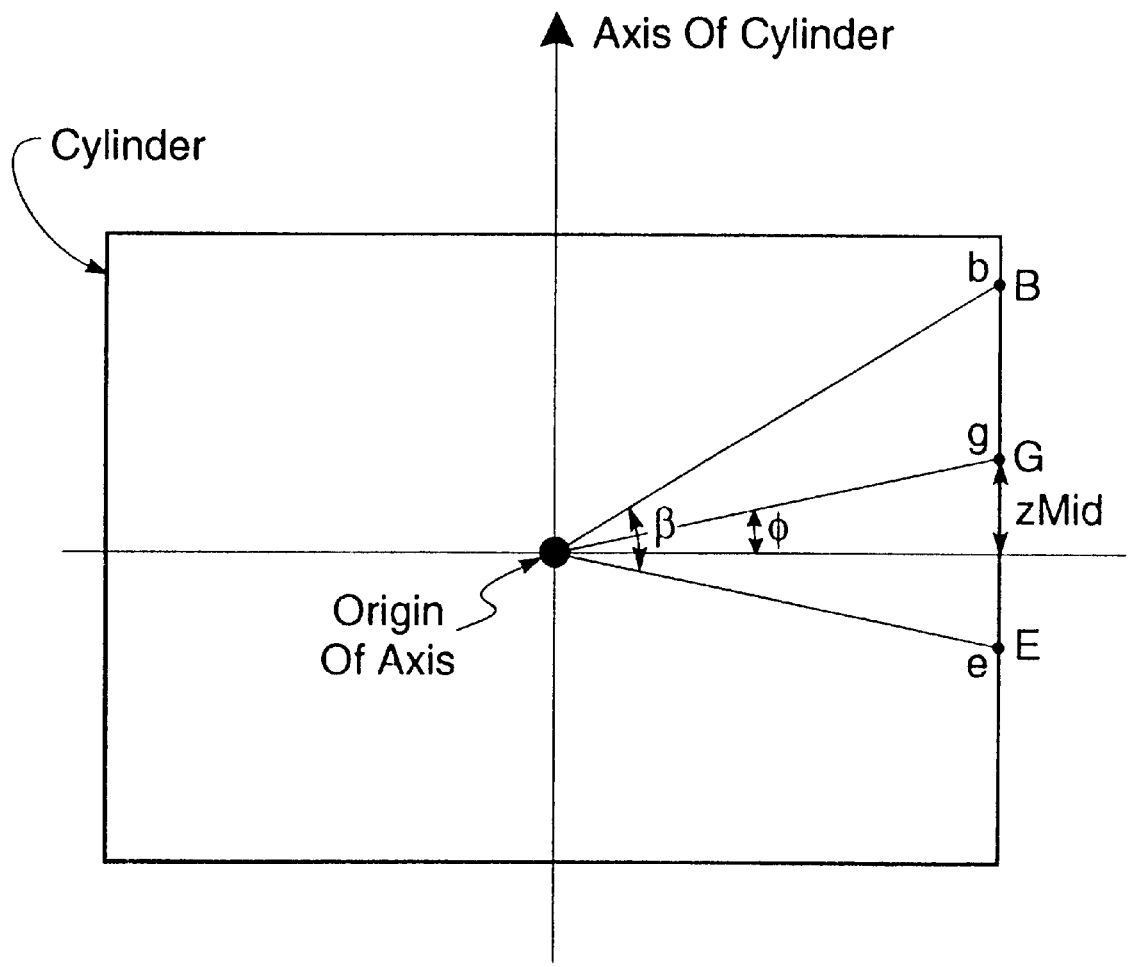
FIG. 7 is a view of the cylinder and projection plane of FIG. 5 as seen from the direction perpendicular to the plane containing the axis of the cylinder and the center line (BE) of the projection plane.

FIG. 7 shows the same cylinder and plane illustrated in FIGS. 5 and 6 as seen from the direction perpendicular to the plane containing the axis of the cylinder and the center line (BE) of the projection plane. The midpoint of center line (BE) is indicated by point G. The elevation angle φ of point (G) corresponds to an elevation value of zMid. The vertical field of view is indicated by β.

In the case of a complete panorama, there is no limit to the possible azimuth angles θ, and the horizontal field of view angle α is limited only by the restriction to being less than 180 degrees. In the case of a partial panorama covering azimuth angles θ from zero to $\theta_{MAX}$, the azimuth angle θ of the center of the projected image must fail within the range of $$\frac{\alpha}{2} \leq \theta \leq (\theta_{MAX} - \frac{\alpha}{2}).$$

There are two factors which limit the range of elevation values z for the a projected images. One is the lack of information for elevation values exceeding the range of the data represented by the cylindrical data. The second limit arises from the result of merging multiple flat images into a cylindrical data structure. Each of the multiple flat images represents the projection of the three dimensional scene onto a plane parallel to the axis of the cylinder. Each of these images has a particular horizontal field of view a and vertical field of view β. Typically, all of these flat images share the same horizontal and vertical fields of view, and the horizontal field of view α is determined by dividing 360 degrees by the number of images.

Figure 8:
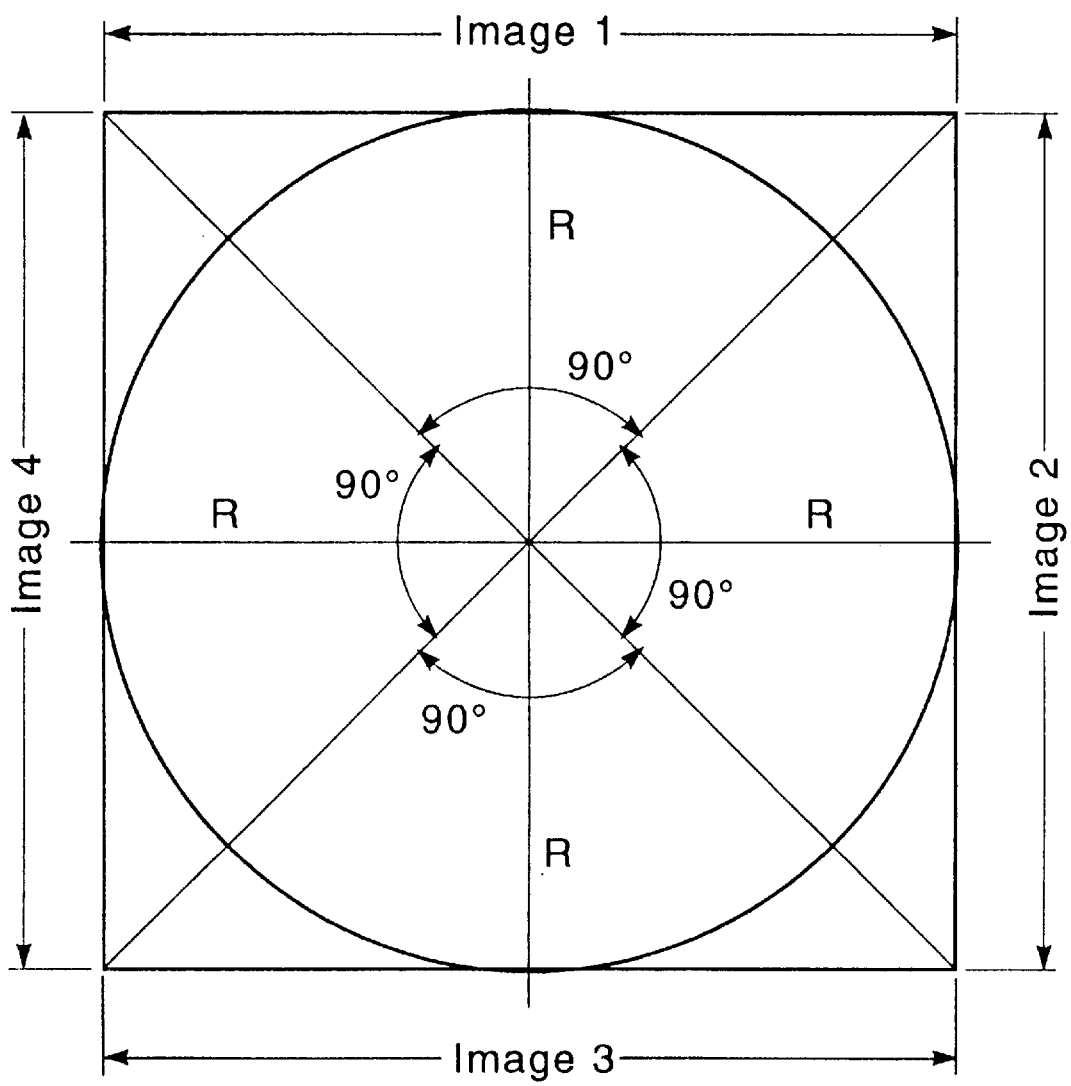
FIG. 8 illustrates the mapping of four images each having a 90° horizontal field of view onto the cylinder of the cylindrical environment map as seen looking down the axis of the cylinder.
Figure 9:
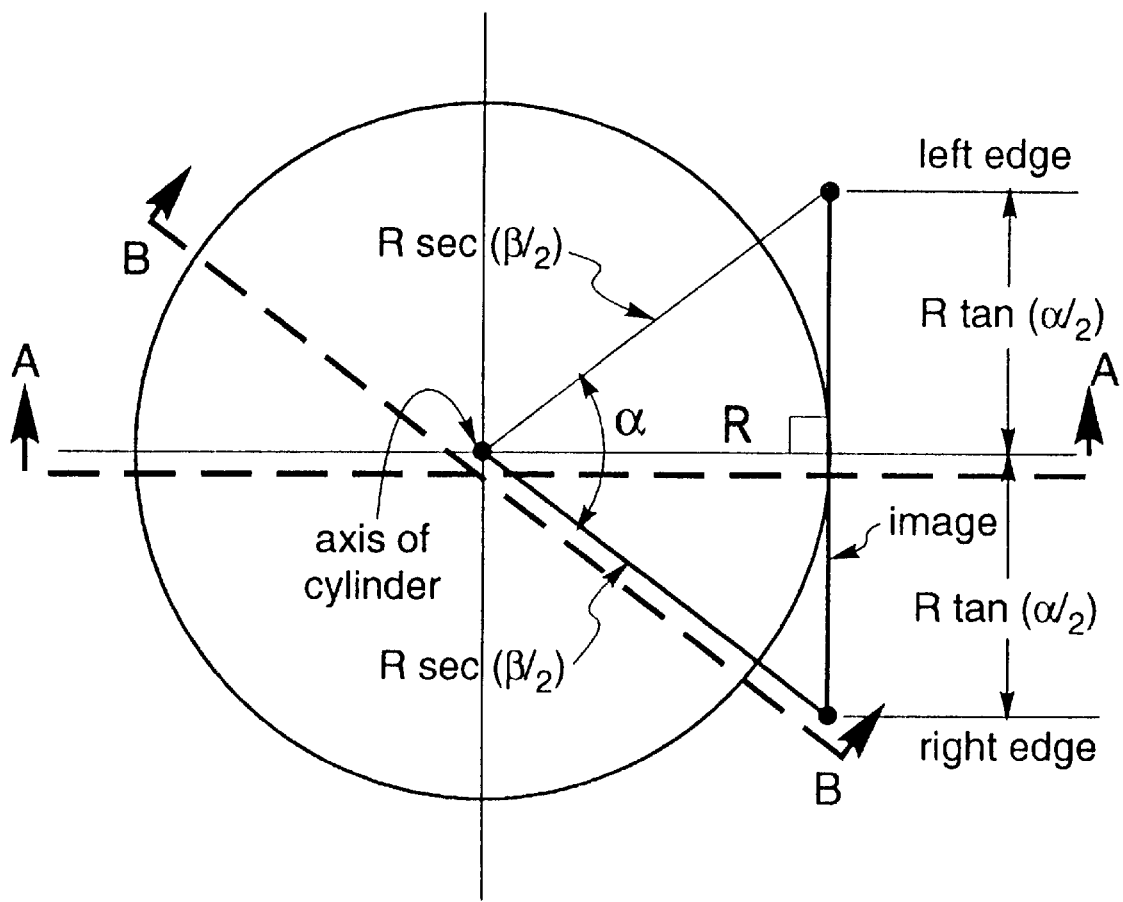
FIG. 9 illustrates the mapping of a single image with a horizontal field of view of a onto the cylinder of the cylindrical environment map as seen looking down the axis of the cylinder.

For example, as shown in FIG. 8 there may be four images, each having a 90 degree horizontal field of view. As seen looking down the axis of the cylinder, the cylinder appears as a circle of radius R where $$R = \frac{PanHgt}{(2*\pi)}$$

where PanHgt is the number of columns in the cylindrical data structure. The center of each image is tangent to this circle. A similar view of a single image with horizontal field of view α is shown in FIG. 9. The distance from the left edge or the right edge to the tangent point is R*tan(α/2). The distance from the axis of the cylinder to the left and right edges is R*sec(α/2).

Figure 10:
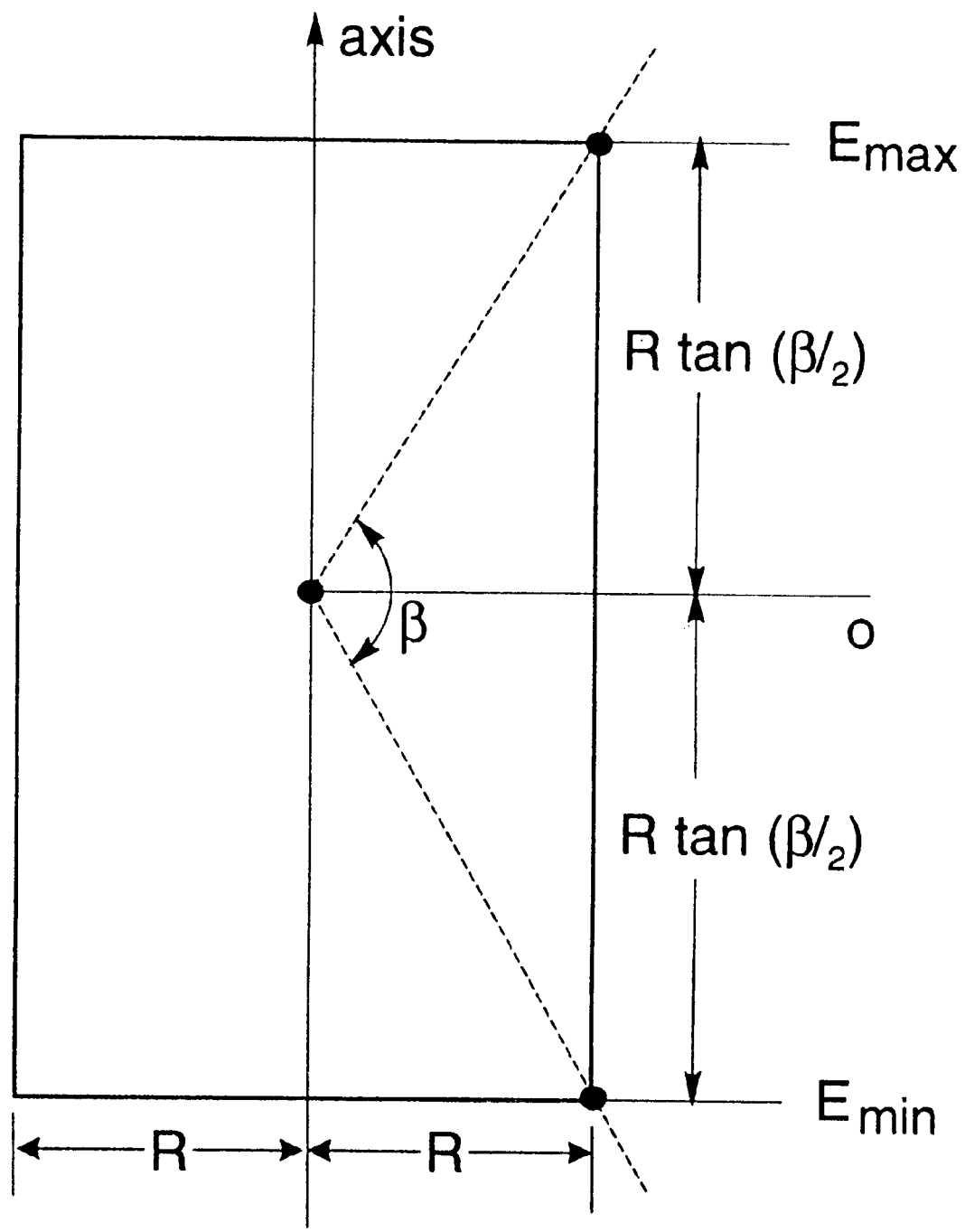
FIG. 10 illustrates a side view of the mapping of the image with a horizontal field of view of $\alpha$ onto the cylinder looking along a direction which is in the plane A—A and perpendicular to the axis of the cylinder as shown in FIG. 9.

A side view of the view of the cylinder of FIG. 9 is shown in FIG. 10. The view direction for FIG. 10 is in the plane A—A and perpendicular to the axis of the cylinder as shown in FIG. 9. More specifically, the view direction of FIG. 10 is along the center line of the image which is tangent to the cylinder at radius R as shown in FIG. 9. The vertical field of view of the image is β, the maximum elevation is Emax= R*tan(β/2), and the minimum elevation is Emin=−R*tan(β/2).

Figure 11:
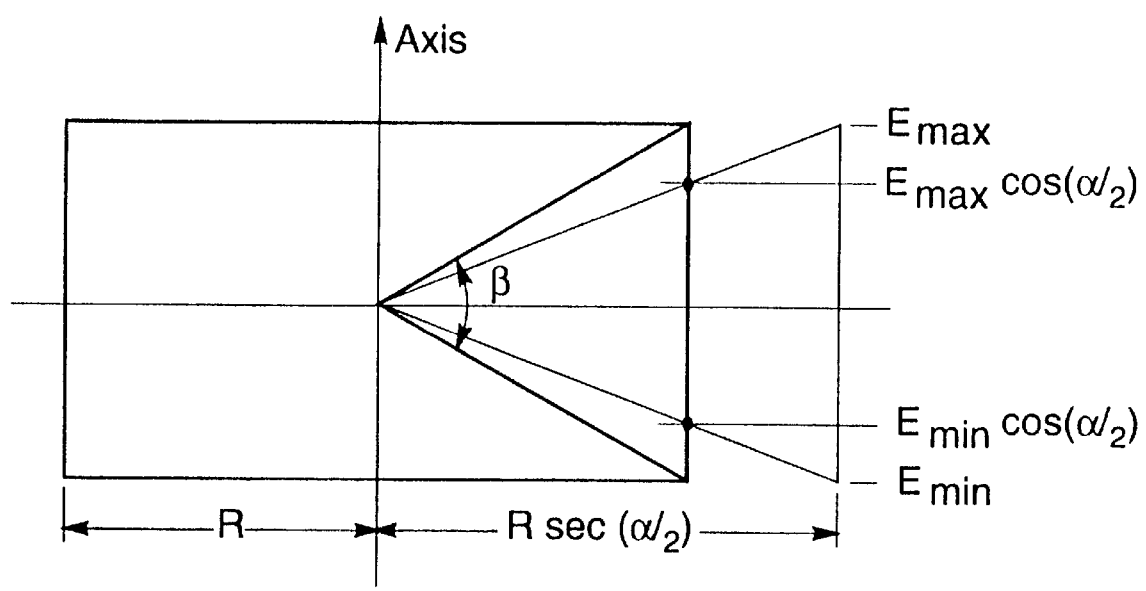
FIG. 11 illustrates a side view of the mapping of the image with a horizontal field of view of $\alpha$ onto the cylinder looking along a direction which is in the plane B—B and perpendicular to the axis of the cylinder as shown in FIG. 9.

Another side view of the cylinder is presented in FIG. 11. In this case, the view direction of FIG. 11 is in the plane B—B and perpendicular to the axis of the cylinder as shown in FIG. 9. More specifically, the view direction of FIG. 11 is along the left or right edge of the image instead of the center of the image. As shown in FIG. 9, the edges of the image are located at distance R*sec(β/2) from the axis of the cylinder. Consequently, the full height of the image becomes compressed into the elevation range of Emax*cos(β/2) to Emin*cos(β/2) on the side of the cylinder at distance R from the axis of the cylinder. Consequently, there is no information in this image corresponding to elevations in the range of Emax*cos(β/2) to Emax, or from Emin to Emin*cos(β/2).

Figure 12:
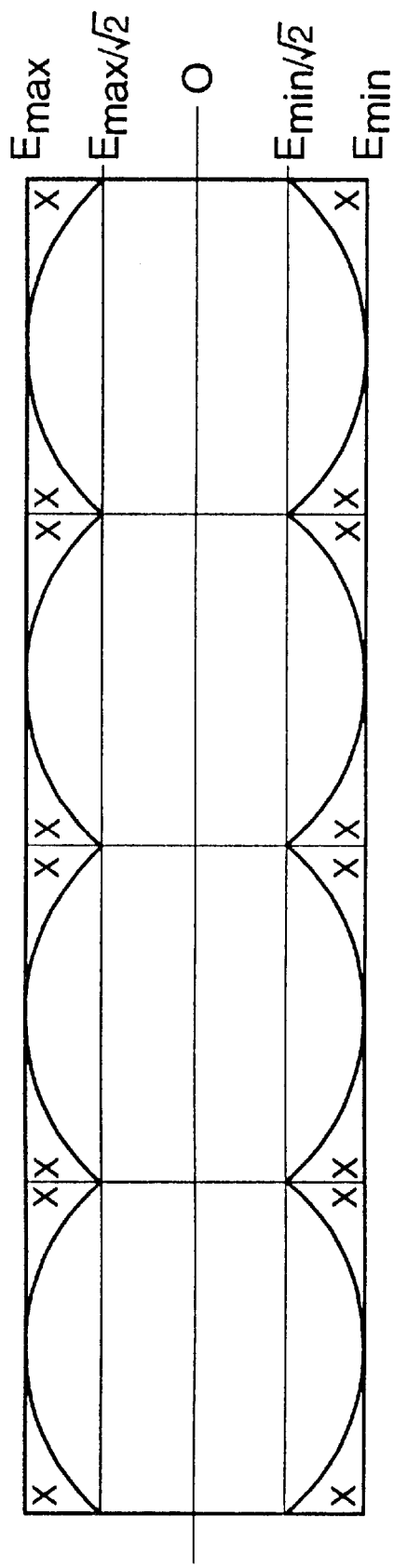
FIG. 12 illustrate an unrolled cylindrical environment map derived from the mapping of the four images onto a cylinder as shown in FIG. 8.

If the resulting cylinder is unrolled onto a flat surface, one obtains the result illustrated in FIG. 12 (for four 90 degree images). In this case, the four images fill all elements of the cylinder corresponding to elevations in the range of Emin/sqrt(2) to Emax/sqrt(2). Additional information is also provided for elevations in the range of Emin to Emin/sqrt(2) and Emax/sqrt(2) to Emax, but the portions of the cylinder marked with (x) and (*) remain undetermined. One solution to this is to throw away the data corresponding to elevations outside the range of Emin/sqrt(2)to Emax/sqrt(2) and limit viewing to this reduced range of elevations. An alternative is to allow elevations to range from Emin to Emax, but to fill the missing regions with solid black or other arbitrary colors.

According to the present invention, the range of the elevation angles for which projected images may be calculated from a cylindrical environment map is supplemented by adding data that defines the top image and/or a bottom image of the cylindrical environment map. The availability of the top and/or bottom images improves the ability to create projected images in two respects. First, these images make it possible to calculate projected images with elevation values exceeding the range covered by the cylindrical region represented by a conventional cylindrical environment map. Second, these images may be used to fill in the corner regions created by protecting multiple flat images onto the cylinder.

Figure 20:
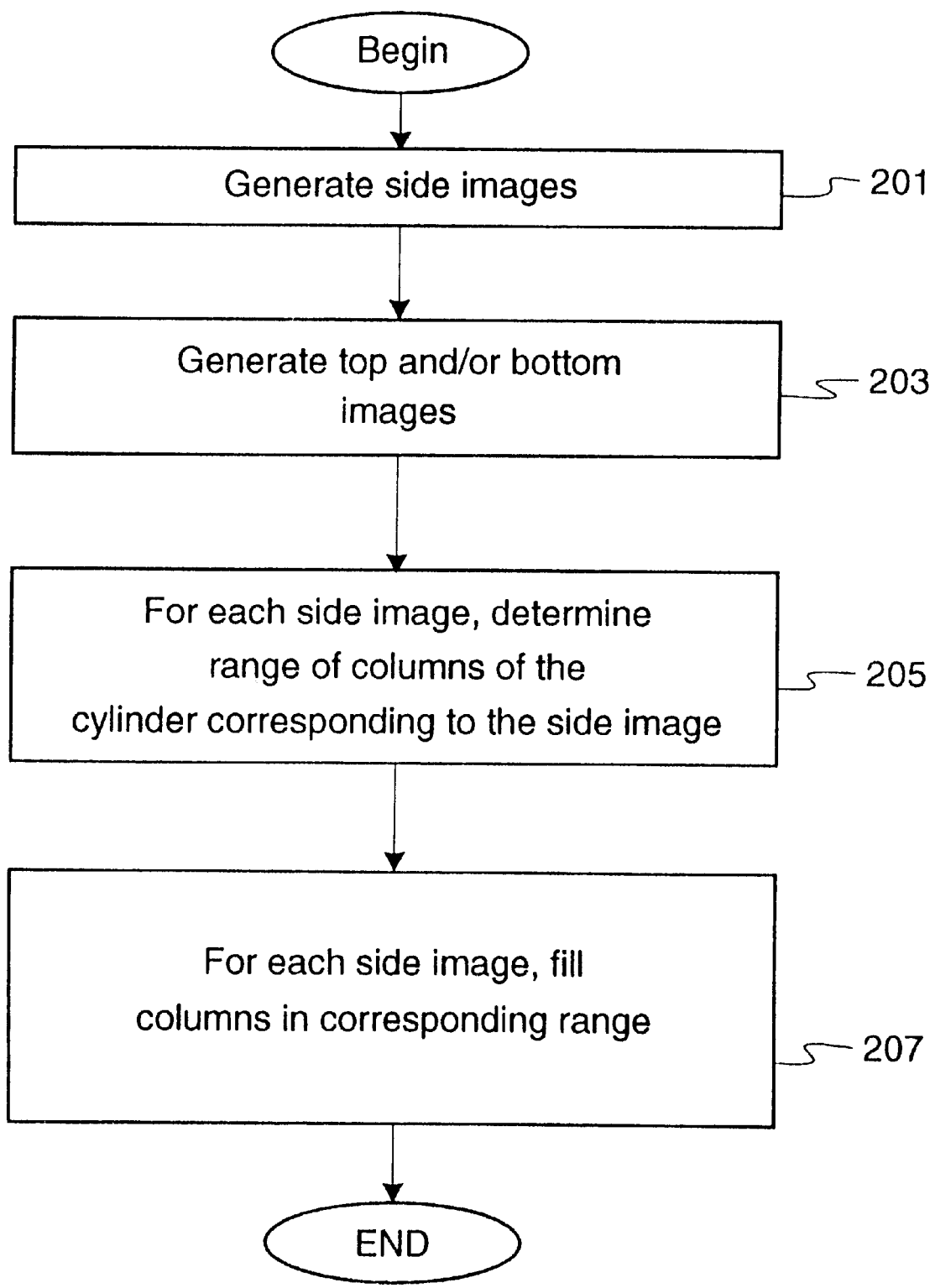
FIG. 20 is a flow chart illustrating the operation of the system in mapping the side images together with top and/or bottom images to the cylindrical environment map according to the present invention.

The procedure for exploiting top and bottom images when assembling side images into a cylindrical environment map is now set forth with reference to FIG. 20. For the sake of illustration, the side images described below are rectangular in shape and the top and bottom images are square in shape. However, those skilled in the art will recognize that the invention is not limited in this respect and may be applied to various polygonal shapes of side, top and bottom images.

Figure 21:
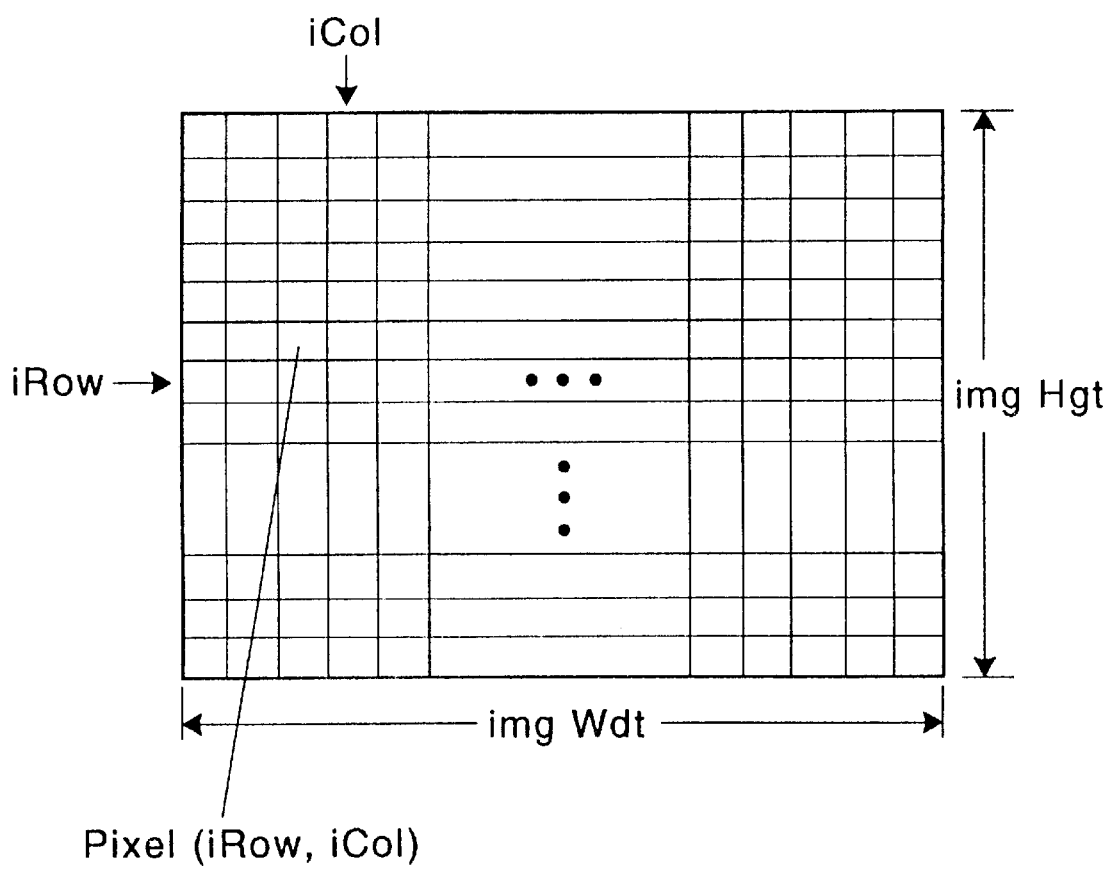
FIG. 21(A) is a pictorial illustration of a side image that is partitioned into a matrix of rows and columns and the data.
FIG. 21(B) is a pictorial illustration of the data stored for each pixel of the side image of FIG. 21(A).
Figure 21:
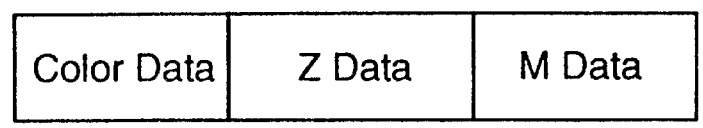

The processing begins in step 201 by generating the side images of the panoramic scene. As is conventional, each side image when generated may be represented by data that indicates the color of the side image at a plurality of elemental areas (or pixels). However, if need be (for example, when the side images are derived from a photograph), it may be necessary in step 201 to partition each side image into elemental areas (or pixels) and, for each elemental area, store the color value of the image at the elemental area. As shown in FIG. 21(A), each side images may be partitioned into a matrix of rows and columns. A given elemental area (or pixel) of a side image is designated by a unique row and column number (iRow, iCol) associated with the side image. In addition, in step 201, for each image, the number of rows in the image, designated imgHgt, and the number of columns in the image, designated imgWdt, are stored. FIG. 21(B) illustrates the information stored for each pixel of the side image. The information includes color data that identifies the color of the pixel. The color data may represent the red, green and blue components of the color of the pixel (true color) or an index to a color palette (palette color). The information stored for a given pixel may also include Z data that represents the depth of the image at the given pixel. In addition, the information stored for each pixel may include additional data (m data) related to the pixel. For example, the data may be actions related to the pixel, including, but not limited to, a hyperlink to another panorama, a command to play a sound, or a command to launch an external application.

The side images may be created by digitizing a panoramic photograph obtained from a panoramic camera in which a narrow vertical slit is used to expose photographic film as the lens and slit rotate about a vertical axis. Alternatively, the side images may be obtained by digitizing a conventional photograph captured on a flat or planar area of photographic film, or through application of computer graphics rendering algorithms to a three dimensional digital model.

Figure 22:
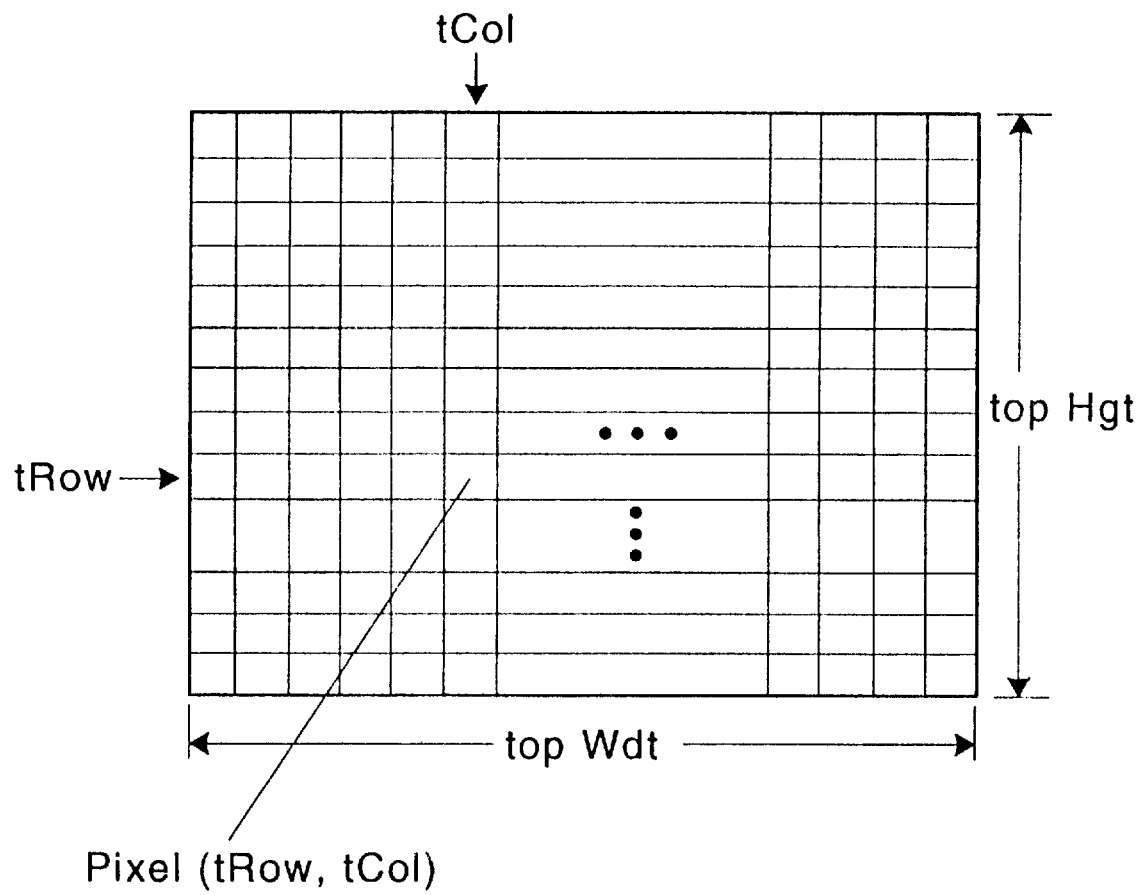
FIG. 22(A) is a pictorial illustration of a top image that is partitioned into a matrix of rows and columns.
FIG. 22(B) is a pictorial illustration of the data stored for each pixel of the side image of FIG. 21(A).
Figure 22:
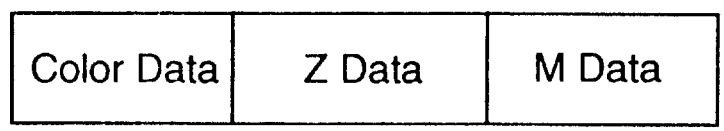

In step 203, top and/or bottom images of the panoramic scene are generated. As is conventional, the top and bottom images when generated may be represented by data that indicates the color of the image at a plurality of elemental areas (or pixels). If need be (for example, when the top and/or bottom image are derived from a photograph), it may be necessary in step 203 to partition the top and/or bottom images into elemental areas (or pixels) and, for each elemental area, store the color value of the image at the elemental area. As shown in FIG. 22, the top and bottom images may be partitioned into a matrix of rows and columns. For the sake of description, only the top image is shown. A given elemental area (or pixel) of a top and bottom images, respectively, is designated by a unique row and column number (tRow,tCol) or (bRow,bCol) associated with the top and bottom images, respectively. In addition, in step 203, the number of rows in the top and/or bottom images, designated topHgt and botHgt, and the number of columns in the top and/or bottom images, designated topWdt and botWdt, are stored.

FIG. 21(B) illustrates the information stored for each pixel of the top image (or bottom image). The information includes color data that identifies the color of the pixel. The color data may represent the red, green and blue components of the color of the pixel (true color) or an index to a color palette (palette color). The information stored for a given pixel may also include Z data that represents the depth of the image at the given pixel. In addition, the information stored for each pixel may include additional data (shown as m data) related to the pixel. For example, the data may be actions related to the pixel, including, but not limited to, a hyperlink to another panorama, a command to play a sound, or a command to launch an external application.

The top and bottom images may be created by digitizing a conventional photograph of the top and bottom images obtained from a camera. Alternatively, the top and bottom images may be generated through application of computer graphics rendering algorithms to a three dimensional digital model. More specifically, the top and bottom images may be defined by projections of the three dimensional scene onto planes perpendicular the axis of the cylinder defining the conventional cylindrical environment map. The top image is defined by projecting the three dimensional scene onto a plane above the origin of the axis of the cylinder, and the bottom image is defined by projecting the three dimensional scene onto a plane located below the origin of the axis of the cylinder.

In step 205, for each side image generated in step 201, the range of columns of the cylinder that correspond to given side image is determined. More specifically, each side image is characterized by the horizontal field of view $\alpha$. The image data of a particular side image is mapped to columns of the cylinder corresponding to a range of azimuth angles from $\theta_1$ to $\theta_2$, where $\theta_1$ is determined by the sum of horizontal fields of view for all preceding side images, and $\theta_2=\theta_1+\alpha$. Thus, given the initial and final azimuth angles $\theta_1$ and $\theta_2$ for the current image, the range of columns in the resulting cylindrical image that correspond to the particular side image are determined as follows:

$$\text{panCol1}=\text{panHgt}*\theta_1/\theta_{MAX}$$

and $$\text{panCol2}=\text{panHgt}*\theta_2/\theta_{MAX},$$

where $\theta_{MAX}$ is equal to $2\pi$ for a complete panorama or less than $2\pi$ for a partial panorama.

In addition, in step 205, for each side image, the number of columns of the cylinder that correspond to each side image is stored. The number of columns of the cylinder that correspond to a given side is given by $$\text{numPanCol}=\text{panCol2}-\text{panCol1}.$$

In step 207, for each side image generated in step 201, each column of the cylinder within the range of columns determined in step 205 to be associated with the particular side image is selected in succession to be filled based on data values of the current side image generated in step 201 as well as the data values of the top and/or bottom images generated in step 203. Preferably, each individual column is selected in succession by designating a column index pan-Col which is initialized to panCol1 and incremented by a step of 1 until reaching panCol2. A more detailed description of the fill operation associated with particular column is described below with respect to FIG. 23.

In step 209, after processing the range of columns that correspond to each side image, the processing ends.

Figure 23:
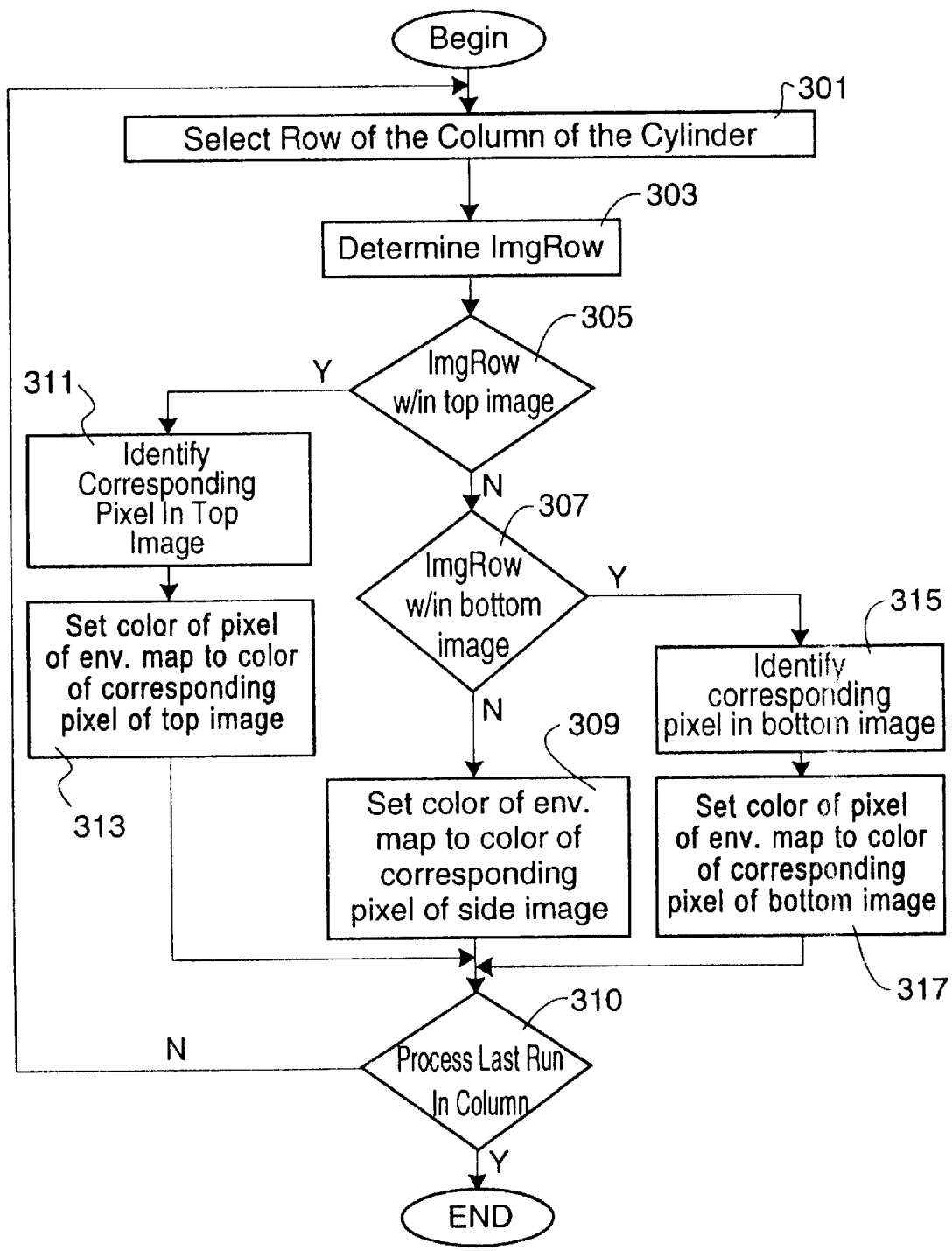
FIG. 23 is a flow chart illustrating operation of the system in filling the pixels of a column of the cylinder within the corresponding pixel in a side image, top image or bottom image.

FIG. 23 illustrates in more detail the fill operation that is associated with a particular column of the cylinder. More specifically, the particular column of the cylinder, designated by the index panCol, corresponds to an absolute angle θ and a local angle δ, where $$\theta = \theta_{MAX} * panCol/panHgt,$$

and $$\delta = \theta - \theta_1 - (\alpha/2).$$

Figure 13:
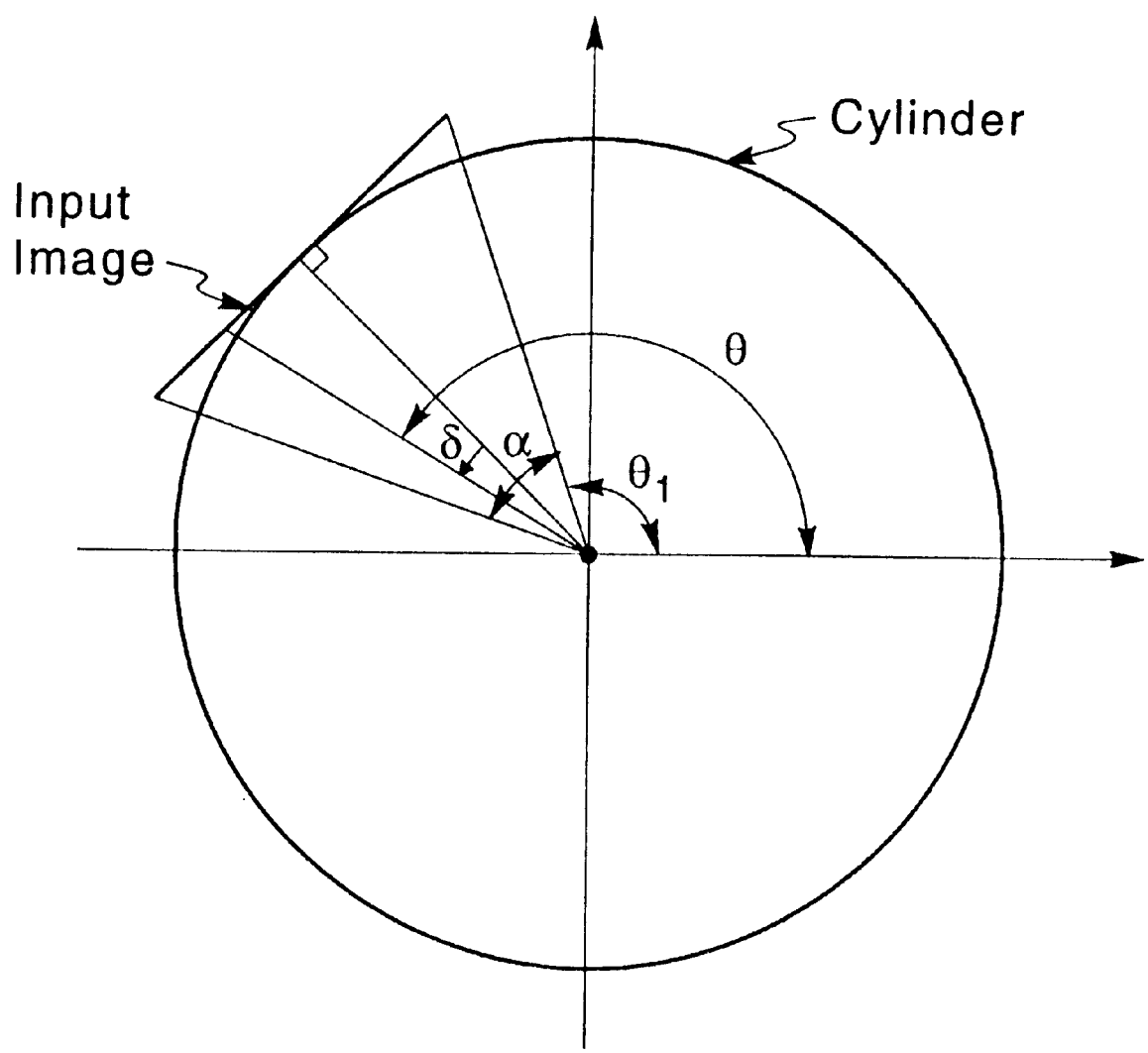
FIG. 13 illustrates the angles $\theta$, $\theta_1$, $\alpha$, and $\delta$ used in mapping an image onto the cylinder of the cylindrical environment map according to the present invention.

The relations between these angles is shown in FIG. 13. For each particular column on the cylinder designated by the index panCol, there is a corresponding column in the side image designated by the index imgCol given by $$imgCol = \frac{imgWdt}{2} \left[ \frac{\tan(\delta)}{\tan\left(\frac{\alpha}{2}\right)} + 1 \right]$$

In step 301, each row of the cylinder, designated panRow, is selected and it is determined whether the current row of the cylinder PanRow falls within the current side image, the top image or the bottom image. The value of panRow ranges from 0 to (panWidth−1) where panWidth is the number of columns in the cylinder.

Figure 14:
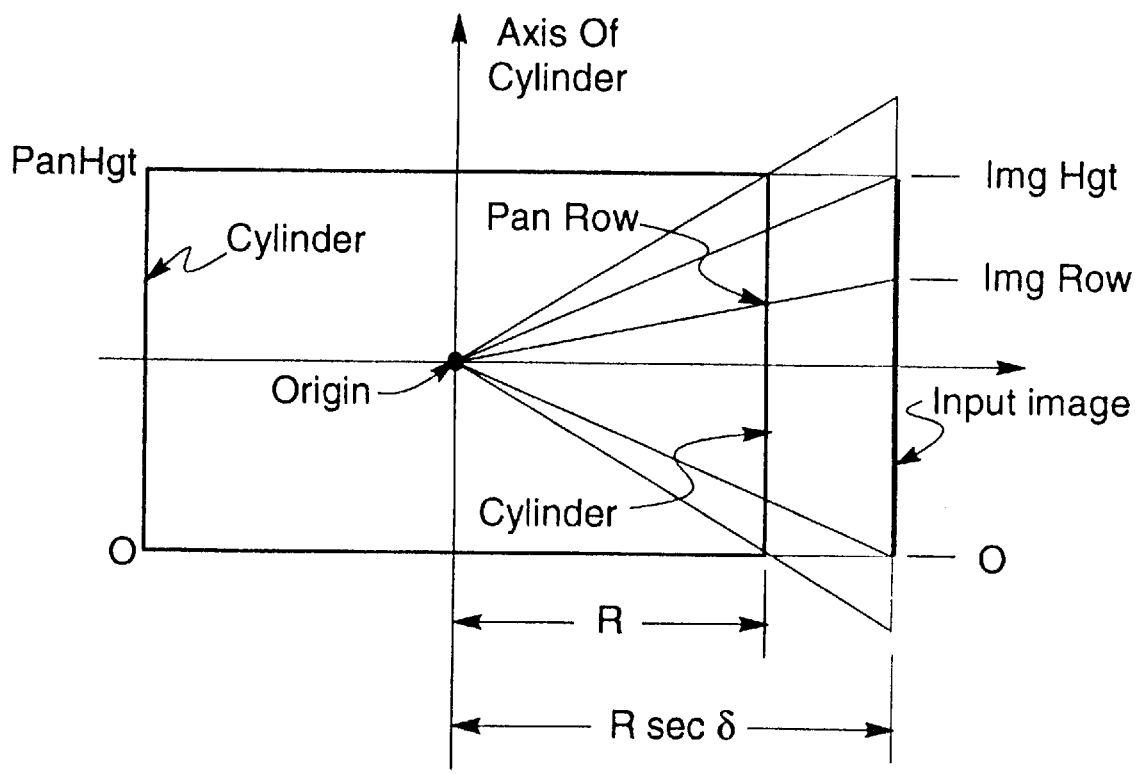
FIG. 14 illustrates the relationship between PanRow and ImgRow which are used to map an image onto a cylinder.

In step 303, a pixel index imgRow that corresponds to the selected row and column of the cylinder is determined. As illustrated in FIG. 14, because the wall of the cylinder is located at a distance R from the axis of the cylinder and the corresponding column of the current side image is located at a distance R*sec(δ) from the axis of the cylinder, the pixel at row panRow on the wall of the cylinder corresponds to a pixel of the current side image at row imgRow, where $$imgRow = \frac{imgHgt}{2} + imgHgt\left[\frac{panRow - (panWidth/2)}{panWidth * \cos(\delta)}\right]$$

In steps 305–309, it is determined whether the current row of the cylinder panRow falls within the current side image, the top image or the bottom image by evaluating the value of ImgRow. After evaluating ImgRow and performing operations that depend upon such evaluations, in step 310 it is determined whether the last row of the column has been processed. If not, operation returns to step 301 to set the row index panRow to the next successive row in the column of the cylinder. If the last row of the column has been selected (panRow=(panWidth−1)), the operation ends.

In step 305, if the value of imgRow is greater than or equal to imgHgt, then the row of the cylinder panRow falls within the top image. In this case, in step 311 the element (pixel) of the top image identified by indices tRow and tCol that corresponds to the current row (panRow and column panCol of the cylinder is determined, and in step 313 the color of the pixel of the cylindrical environment map identified by the indices PanRow, panCol is preferably set to correspond to the color of the pixel of the top image identified by the indices tRow,tCol.

In step 307, if the value of imgRow is less than 0, then the row of the cylinder panRow falls within the bottom image. In this case, in step 315 the element (pixel) of the bottom image identified by indices bRow and bCol that corresponds to the current row Panrow and column panCol of the cylinder is determined, and in step 317 the color of the pixel of the cylindrical environment map identified by the indices PanRow, panCol is preferably set to correspond to the color of the pixel of the bottom image identified by the indices bRow,bCol.

In step 309, the value of imgRow is within the range of 0 to imgHgt, and thus the row of the cylinder panRow falls within the current side image. In this case, the pixel of the cylindrical environment map identified by the indices panRow,panCol corresponds to the pixel of the current side image identified by the indices imgRow, imgCol. In step 309, the color of the pixel of the cylindrical environment map identified by the indices PanRow, panCol is preferably set to correspond to the color of the pixel of the current side image identified by the indices imgRow, imgCol.

Figure 15:
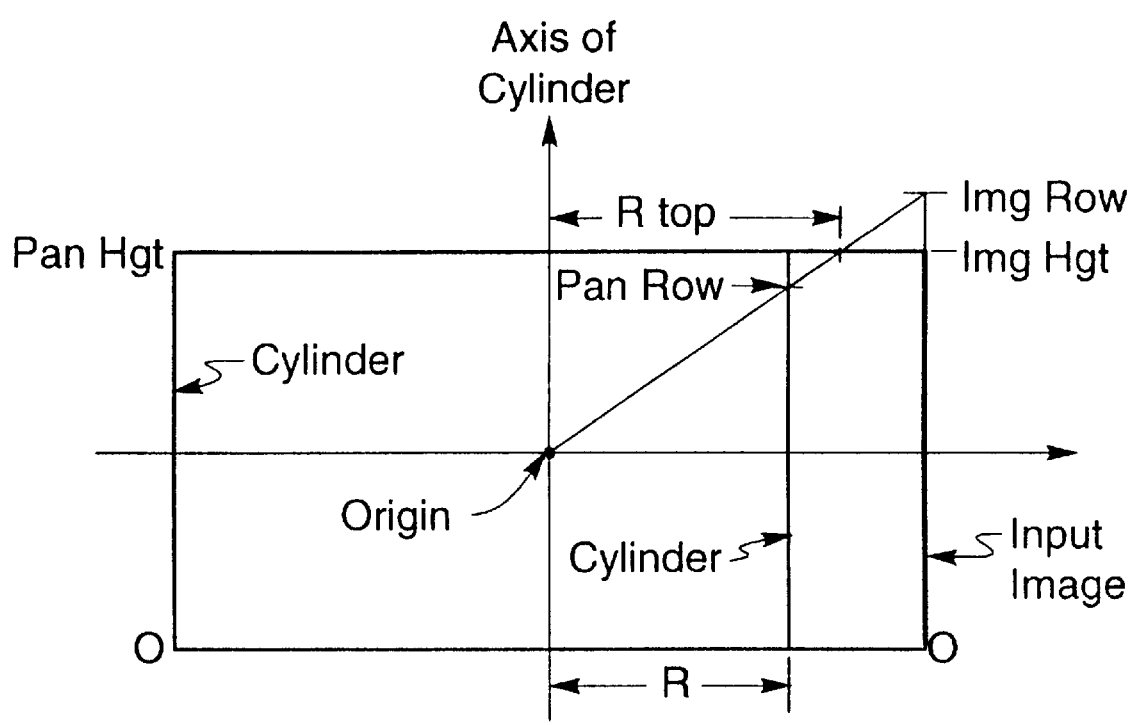
FIG. 15 illustrates the relationship between PanRow and Rtop for a point in a top image.
Figure 24:
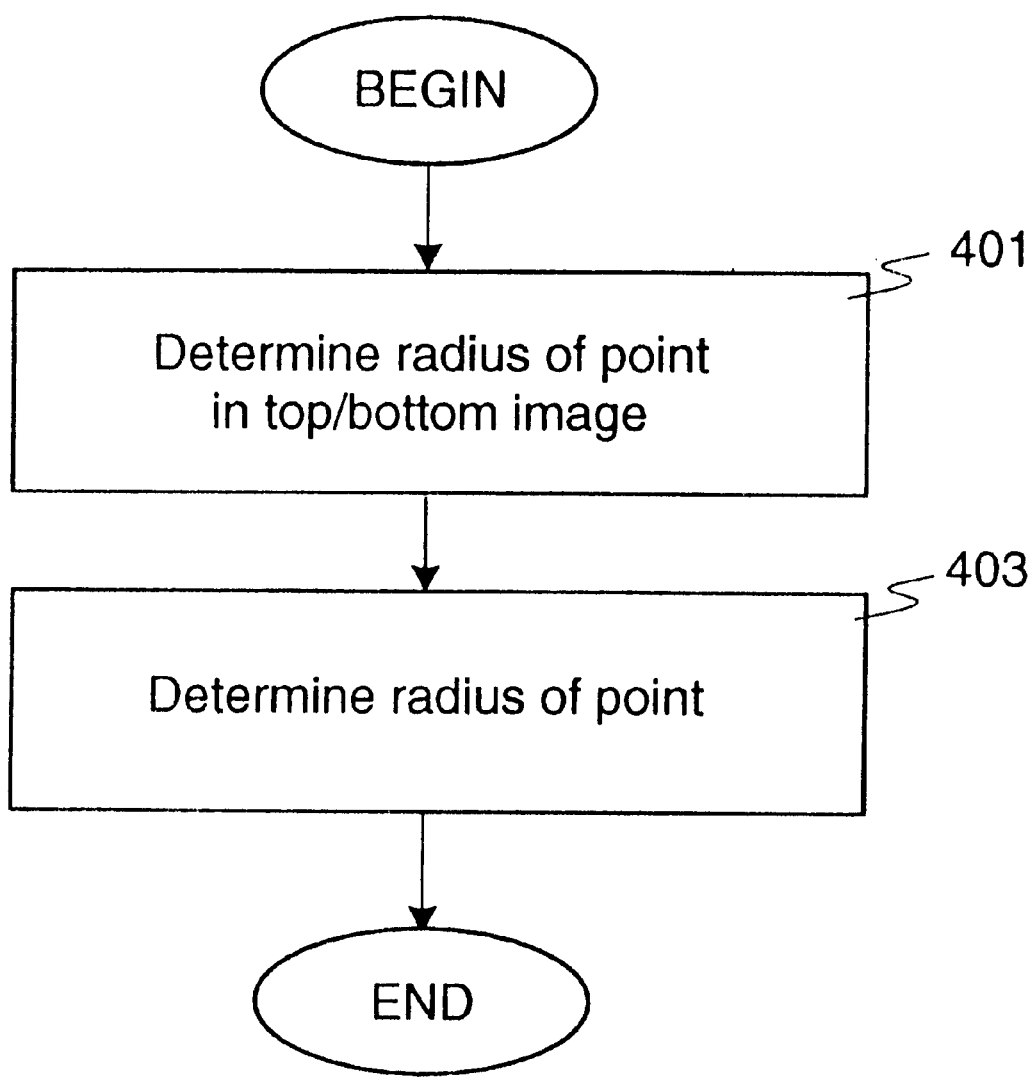
FIG. 24 is a flow chart illustrating operation of the system in determining the pixel in the top or bottom image that corresponds to a given pixel in a column of the cylinder.

The operation of the system in determining the element (pixel) of the top image or bottom image that corresponds to the current row Panrow and column panCol of the cylinder is set forth below with respect to FIG. 24. In step 401, the operation begins by determining the radius of the corresponding point in the top (or bottom) image. This is illustrated in FIG. 15 for a point in the top image. In this case the radius of the point in the top image is given by $$Rtop = R*(panHgt/2)/(panRow-(panHgt/2)).$$

The radius of the point in the bottom image is given by $$Rbot = R*(panHgt/2)/((panHgt/2)-panRow).$$

For the current purposes, the cylinder may be treated as a unit circle with R=1. The resulting values of Rtop and Rbot will always be greater than 1.0, corresponding to points outside a unit circle.

Figure 16:
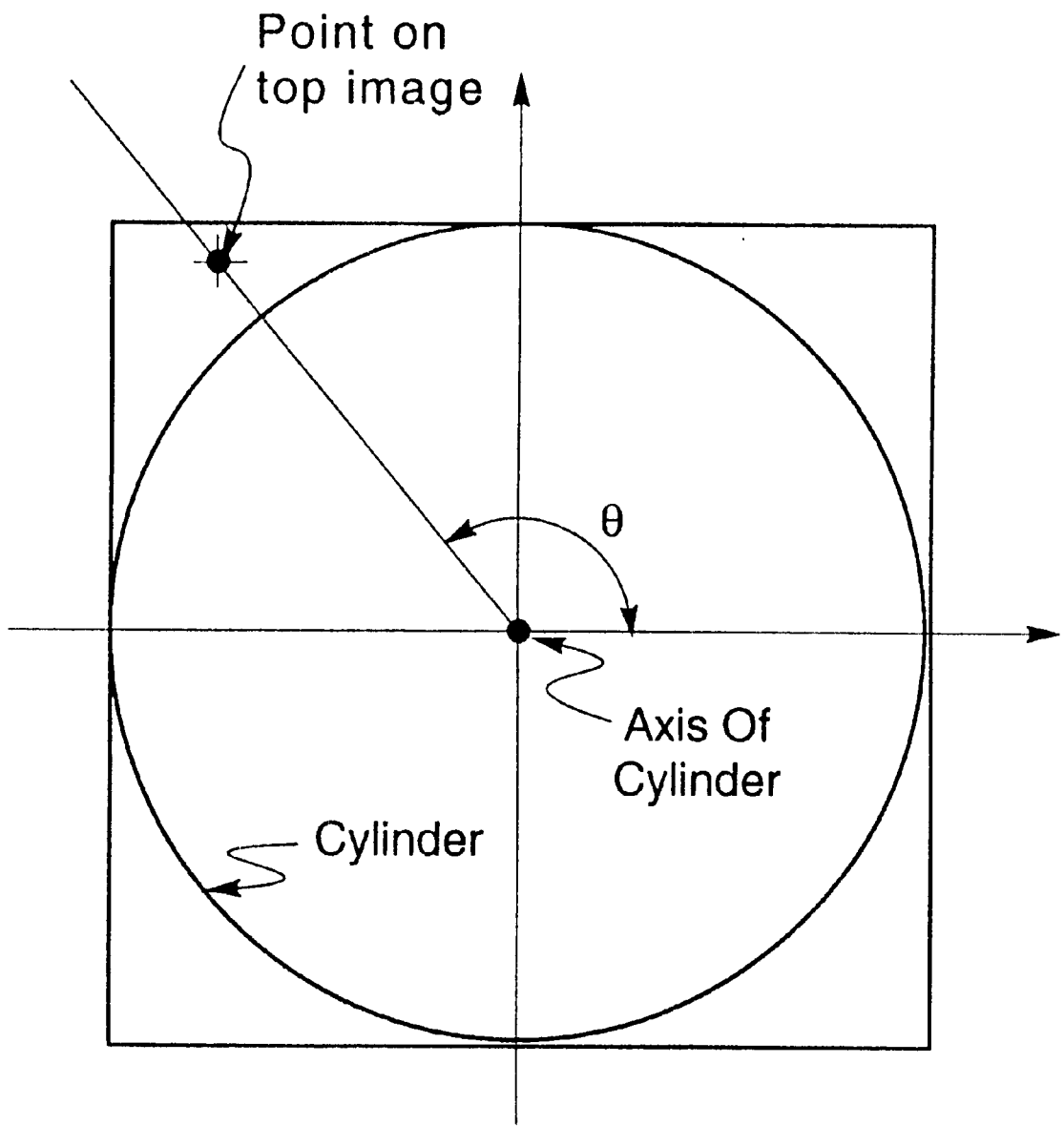
FIG. 16 illustrates the location of a point in the top image.

In step 403, after determining the top radius Rtop (or bottom radius, Rbot), the indices that identify the point in the top (or bottom) image as illustrated in FIG. 16 are determined. In the case of a point in the top image, the row and column indices of the color values in the top image may be determined as $$tRow = topHgt*(1.0-Rtop*\sin(\theta)),$$

and $$tCol = topWdt*(1.0+Rtop*\cos(\theta)),$$

where topHgt and topWdt are the row and column dimensions of the top image.

Likewise, the row and column indices for a point in a bottom image may be determine by $$bRow = botHgt*(1.0 - Rbot*\sin(\theta)),$$

and $$bCol = botWdt*(1.0 - Rbot*\cos(\theta)).$$

As describe above, the points specified by the indices (tRow, tCol) and (bRow, bCol) correspond to pixels in the top and bottom images located outside an inscribed circle corresponding to the top and bottom edges of the walls of the cylinder. Preferably, the mapping of the points of the top (or bottom) image outside this circle to the cylindrical environment map are handled by the projection algorithm used for viewing the panoramic data set forth below.

Figure 25:
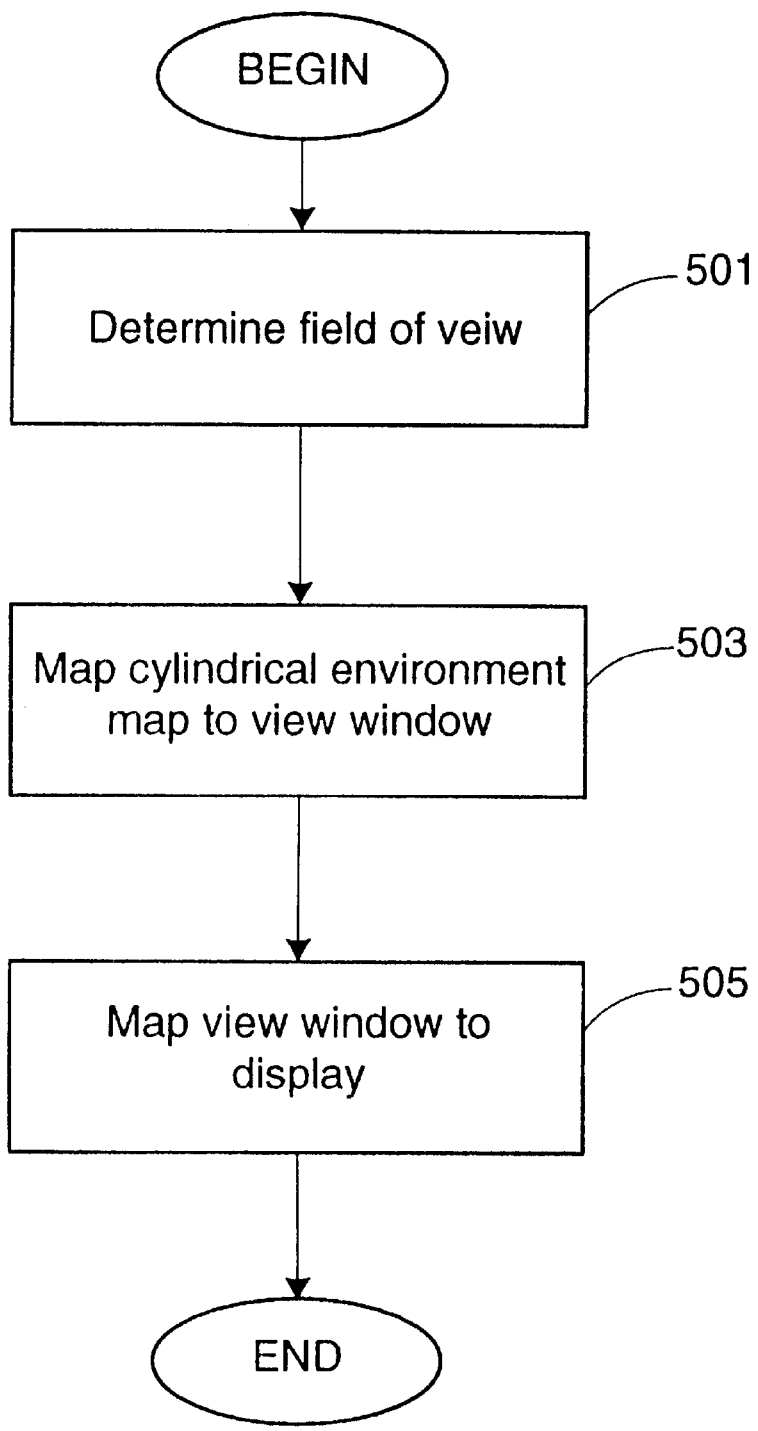
FIG. 25 is a flow chart illustrating operation of the system in generating a view of a panoramic image mapped to a cylindrical environment map.

Having set forth a mechanism that supplements a cylindrical environment map with data defining the top image and/or bottom image of a panoramic scene, a technique to render the improved cylindrical environment map of the present invention for display is now set forth with reference to FIG. 25.

Figure 17:
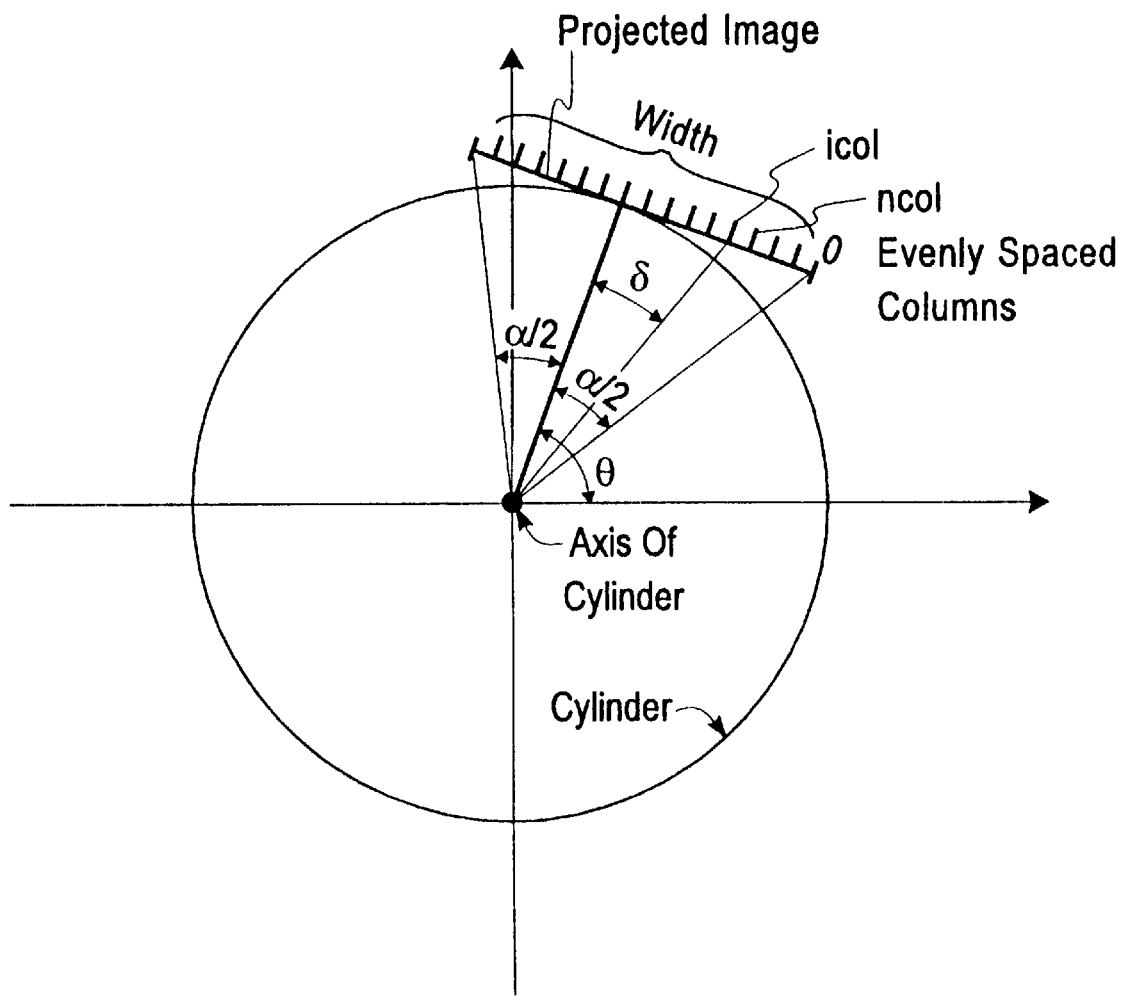
FIG. 17 illustrates a field of view and a viewing plane that corresponds to the field of view and upon which is projected the portions of the cylindrical environment map within the field of view.

In step 501, a field of view is determined. The field of view is preferably characterized by the following parameters: an azimuth angle $\theta$, an elevation angle $\phi$ for the center of a projected image, a horizontal field of view $\alpha$, and a vertical field of view $\beta$. The selected parameters are shown in FIG. 17. The parameters may be selected based upon user input commands generated, for example, in response to the user manipulating the input device 107 of the computer system.

In step 503, the cylindrical environment map is mapped to a view window that 10 corresponds to the field of view. The mapping operation begins by partitioning the view window into ncol evenly spaced columns as shown in FIG. 17. Each of the ncol columns may be identified by an index icol which ranges from 0 to ncol−1 and corresponds to an angle $\delta$ given by $$\delta = \tan^{-1}(\tan(\alpha/2)*(width - 2*icol)/(2*width))$$

where width=ncol−1 is the width of the view window. For each column (icol) of the ncol columns of the view window, the column panCol of the cylindrical environment map that corresponds to the column icol is determined. Preferably, the column panCol of the cylindrical environment map that corresponds to the column icol is determined as follows:

$$panCol = panHgt*(\theta + \delta)/\theta_{MAX}$$

In addition, nrow pixels within the column icol of the view window are selected and processed.

Figure 18:
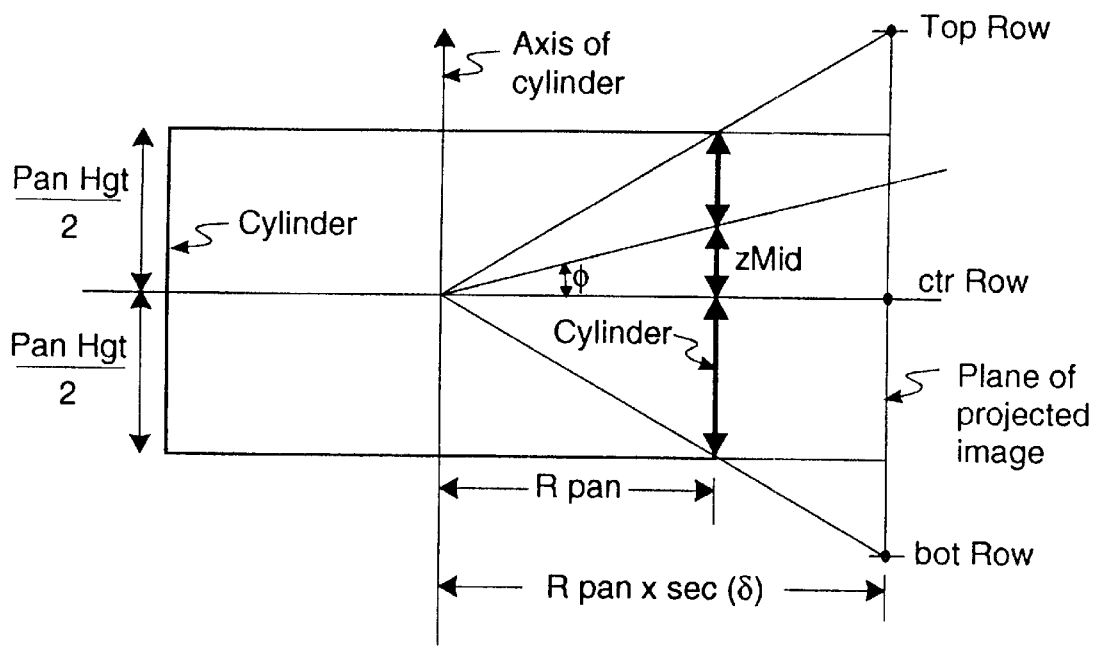
FIGS. 18 and 19 illustrate a side view of the projection of portions of the cylindrical environment map onto the view window.

Preferably, the nrow pixels within the column are uniformly spaced along a line parallel to the axis of the cylinder at a distance of Rpan/cos(delta) from the axis of the cylinder as shown in FIG. 18. Each of the nrow pixels may be assigned an index irow which has a range from 0 (bottom of the view window) to nrow-1 (top of the view window). A more detailed description of the processing of the nrow pixels of the selected column (designated icol) of the view window is set forth below with reference to FIG. 26.

Finally, in step 505, after mapping the columns of the cylindrical environment map to the view window, the view window may be mapped to a display or portion of the display. Such a mapping may require scaling and translating the view window to the display device coordinate system. Techniques for such scaling and translating are well known in the field. However, the scaling operation may be avoided in order to increase the performance of the system. In this case, the pixels of the view window must be made to match the pixels if the display window.

Figure 26:
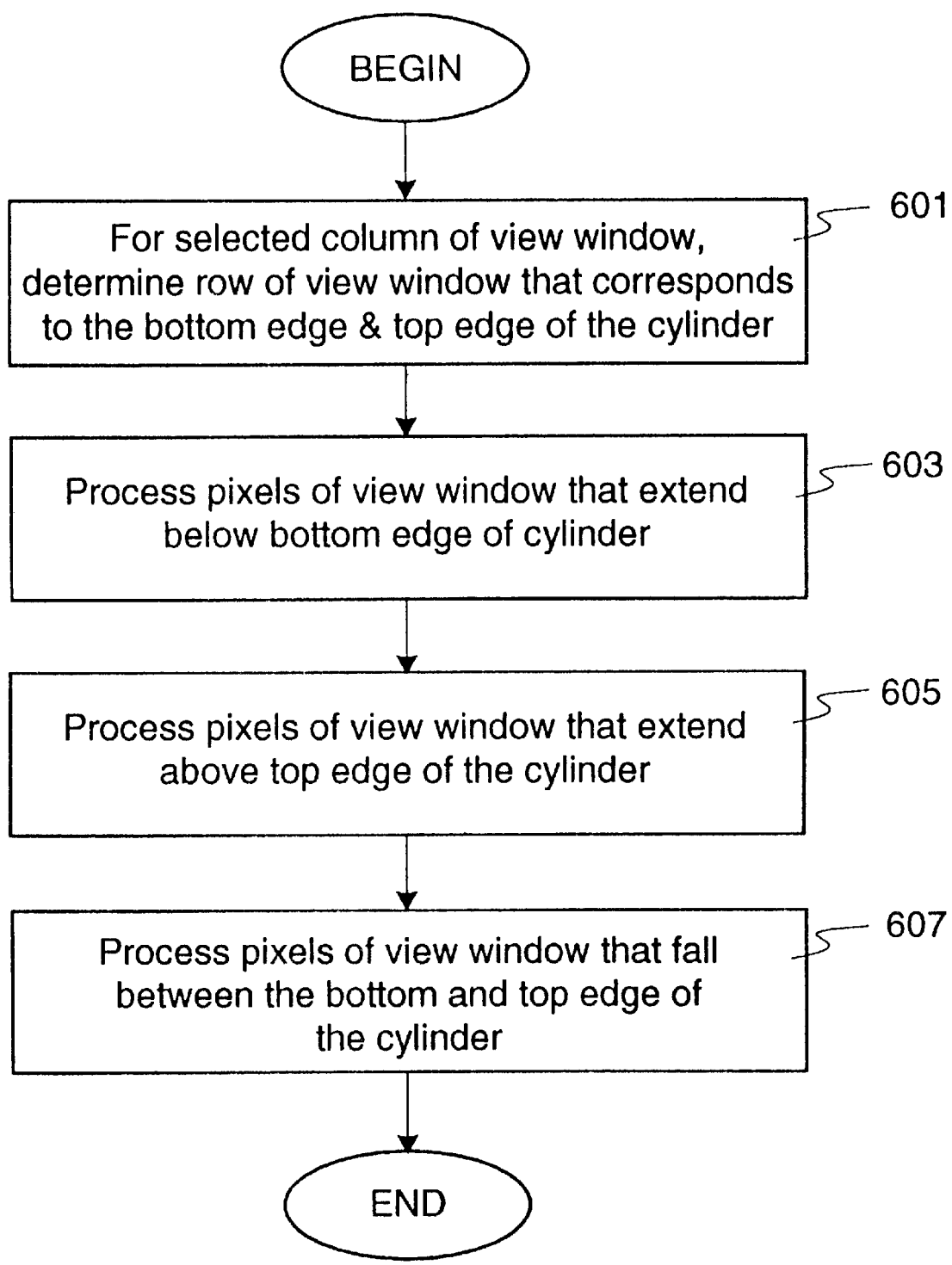
FIG. 26 is a flow chart illustrating operation of the system in rendering the pixels of a selected column of the view window according to the present invention.

FIG. 26 illustrates the operation of the system in mapping the cylindrical environment map to the nrow pixels of a selected column (icol) of the view window. As described above, the column panCol of the cylindrical environment map that corresponds to the column icol is determined as follows:

$$panCol = panHgt*(\theta + \delta)/\theta_{MAX}$$

In step 601, the operation begins by determining, for the selected column icol, the row of the view window that corresponds to the top and bottom edges of the cylinder, which is designated topRow and botRow, respectively. The values of topRow and botRow are preferably determined as follows:

$$topRow = ctrRow + (0.5*panHgt/pxlSize)*\sec(\delta),$$

and $$botRow = ctrRow - (0.5*panHgt/pxlSize)*\sec(\delta),$$

where pxlSize=2*Rpan*tan($\alpha$/2)/width is the size of a pixel, assuming square pixels (vertical pixel size equal to the horizontal pixel size).

The value of TopRow and BotRow described above depend upon the location of the center pixel ctrRow of the view window. In the absence of vertical view motion (view elevation angle $\phi$ equal to zero), the pixel index for the center line ctrRow is given by $$ctrRow = 0.5*height.$$

As the view elevation changes, the center of the view window corresponds to the row of the cylinder determined by $$zMid = Rpan*\tan(\phi).$$

As a result, the row of the view window corresponding to zero elevation becomes $$ctrRow = 0.5*height - zMid/pxlSize.$$

In step 603, it is determined if any of the nrow pixels of the view window extend below the bottom edge of the cylinder (and thus fall within the bottom image), and if so processes those pixels of the view window that extend below the bottom edge of the cylinder. Preferably, a value of botRow greater than 0 indicates that one or more pixels of the view window extend below the bottom edge of the cylinder, and thus fall within the bottom image. In this case, if the value of botRow is greater than 0, the pixels in the range from 0 to botRow−1 extend below the bottom edge of the cylinder. The processing of the pixels that extend below the bottom edge of the cylinder is set forth below.

In step 605, it is determined if any of the nrow pixels of the view window extend above the top edge of the cylinder (and thus fall within the top image), and if so processes those pixels of the view window that extend below the top edge of the cylinder. Preferably, a value of topRow less than nrow−1 indicates that one or more pixels of the view window extend above the top edge of the cylinder, and thus fall within the top image. In this case, if the value of topRow is less than nrow−1, the pixels in the range from topRow to nrow−1 extend above the top edge of the cylinder. The processing of the pixels that extend above the top edge of the cylinder is set forth below.

Finally, in step 607, the nrow pixels of the view window that are not below the bottom edge of the cylinder nor above the top edge of the cylinder (and thus fall within the cylindrical environment map) are processed. Preferably, the nrow pixels that are not below the bottom edge of the cylinder nor above the top edge of the cylinder lie in the range from botRow to topRow−1.

The processing of the pixels that neither extend above the top edge of the cylinder nor extend below the bottom edge of the cylinder is set forth below.

The processing of those pixels that extend above the top edge of the cylinder is now forth. As described above, the pixels that extend above the top edge of the cylinder may be identified by an index icol that ranges from topRow to nrow−1. In this case, for each pixel identified by the index icol ranging from topRow to nrow−1, the value of a top radius Rtop that corresponds to the pixel, in addition to the row and column indices (trow and tCol) for the pixel in the top image are determined. Preferably, the top radius Rtop is given as $$Rtop=Rpan*sec(\delta)*(0.5*panWidth)/(irow-ctrRow).$$

Figure 19:
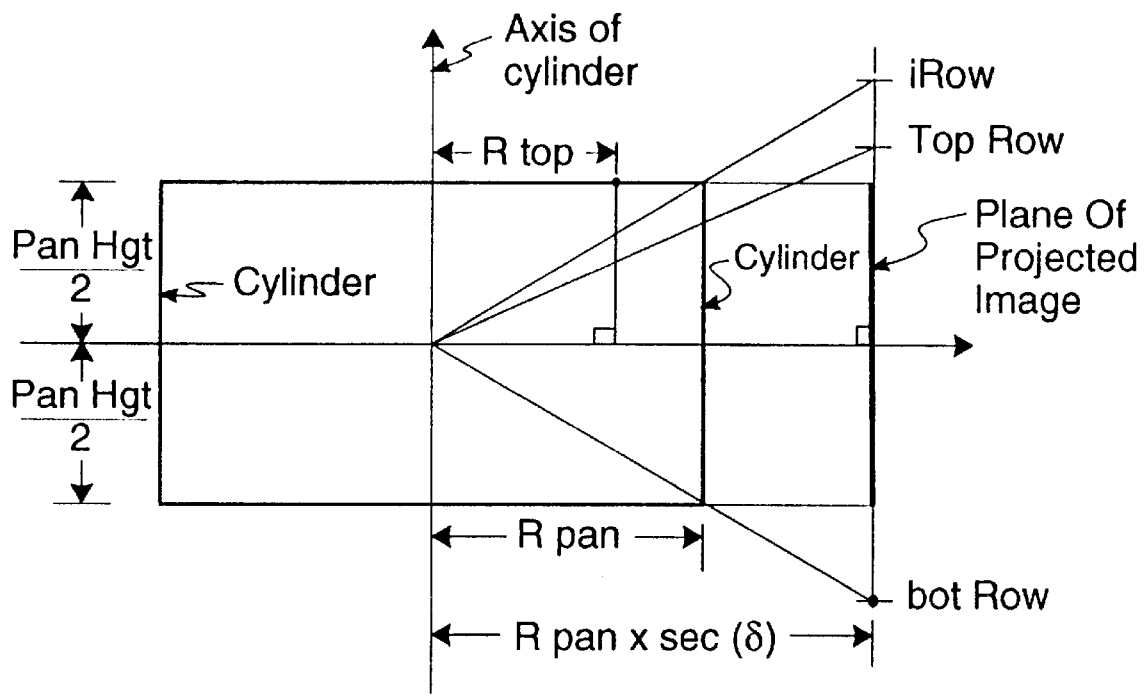

This is based on the comparison of similar right triangles as identified in FIG. 19 wherein one of the triangles has a width Rpan*sec(δ) and height (irow−ctrRow) and the second triangle has a width Rtop and height (0.5*panHgt). For the current purposes, all that is needed is the ratio of Rtop to Rpan, so the calculation of Rtop reduces to $$Rtop=radRow/(irow-ctrRow).$$

where radRow=0.5*panHgt*sec(δ) is a constant for a column of pixels (constant delta).

The row and column indices (tRow, tCol) for the pixel in the top image are preferably determined by $$tRow=topHgt*(1.0-Rtop*sin(\theta+\delta)),$$

and $$tCol=topWdt*(1.0+Rtop*cos(\theta+\delta)).$$

Finally, the color of the pixel of the view window identified by the indices irow, icol is preferably set to correspond to the color of the pixel of the top image identified by the indices tRow,tCol.

The processing of those pixels that extend below the bottom edge of the cylinder is now forth. As described above, the pixels that extend above the top edge of the cylinder may be identified by an index icol that ranges from 0 to botRow−1. in this case, for each pixel identified by the index icol ranging from 0 to botRow−1, the value of a bottom radius Rbot that corresponds to the pixel, in addition to the row and column indices (brow and bCol) for the pixel in the bottom image are determined.

Preferably, the bottom radius Rbot is given by $$Rbot=radRow/(ctrRow-irow).$$

The row and column indices (bRow, bCol) for the pixel in the bottom image are preferably determined by $$bRow=topHgt*(1.0-Rtop*sin(\theta+\delta)),$$

and $$bCol=topWdt*(1.0+Rtop*cos(\theta+\delta)).$$

Finally, the color of the pixel of the view window identified by the indices irow, icol is preferably set to correspond to the color of the pixel of the bottom image identified by the indices bRow,bCol.

The processing of the pixels that neither extend above the top edge of the cylinder nor extend below the bottom edge of the cylinder is now set forth. For each pixel that neither extends above the top edge of the cylinder nor extends below the bottom edge of the cylinder, the row of the cylindrical environment map PanRow that corresponds to the row irow of the view window is given as:

$$PanRow = \frac{PanWidth}{2} - R\cos\theta\left[\frac{irow - \frac{nrow}{2}}{2*ncol*\tan\left(\frac{\alpha}{2}\right)} + \tan\phi\right]$$

Then, the color of the pixel of the view window identified by the indices irow, icol is preferably set to correspond to the color of the pixel of the cylindrical environment map identified by the indices panRow,panCol.

The calculations for determining the projection of the top and bottom images onto the view window are more laborious than the calculations needed for the determining the projection of the cylindrical environment map onto the view window. This can cause a loss of performance when a large portion of the projected image is determined by points in the top and/or bottom images. The performance penalty is very small when only a small part of the projected image is determined by pixels in the top and/or bottom images. There is no performance penalty for top and bottom points located outside the unit circle of the cylinder.

Although the calculations of indices for pixels derived from the top and bottom images depend on sine and cosine trigonometric functions, the arguments of these unctions depend only on the olumn index (angle δ), not on the row index. Consequently these values are preferably computed only once per column.

Advantageously, by integrating the top and bottom images to a cylindrical environment map, the present invention provides for an increased field of view with only a modest increase in the data.

In another aspect of the present invention, it is possible for a server to store one or more files that contain the cylindrical environment map of the present invention. A client connected to the server over a network can download the file(s) from the server and perform the rendering operations of the present invention as described above. However, the step of communicating the file(s) over the network may be very slow due to network communication bandwidth limitations. This may result in a long delay between initiation of the network communication step and the appearance of the image in the display window of the display device.

In order to minimize effects of such network communication delays, the cylindrical environment map of the present invention stored on the server may be represented by a plurality of cylindrical environment maps of varying degrees of resolution. Lower resolution environments maps contain less data than higher resolution environment maps, and thus take less time to communicate over a network. As is conventional in other image processing operations, the lower resolution cylindrical environment may be created from one or more higher resolution cylindrical environment maps. For example, a lower resolution cylindrical environment map with ¼ the number of elements (pixels) of a first cylindrical environment map may be created by averaging each 2×2 block of pixels in the first cylindrical environment map.

In this scenario, the client is controlled to first request/receive the lowest resolution environment map and render the lowest resolution environment map. After (or concurrent with) the rendering of the lowest resolution environment map, the client may request/receive a higher resolution environment map and render the higher resolution environment map. This process may be repeated until the highest resolution environment is received by the client and rendered for display.

Figure 27:
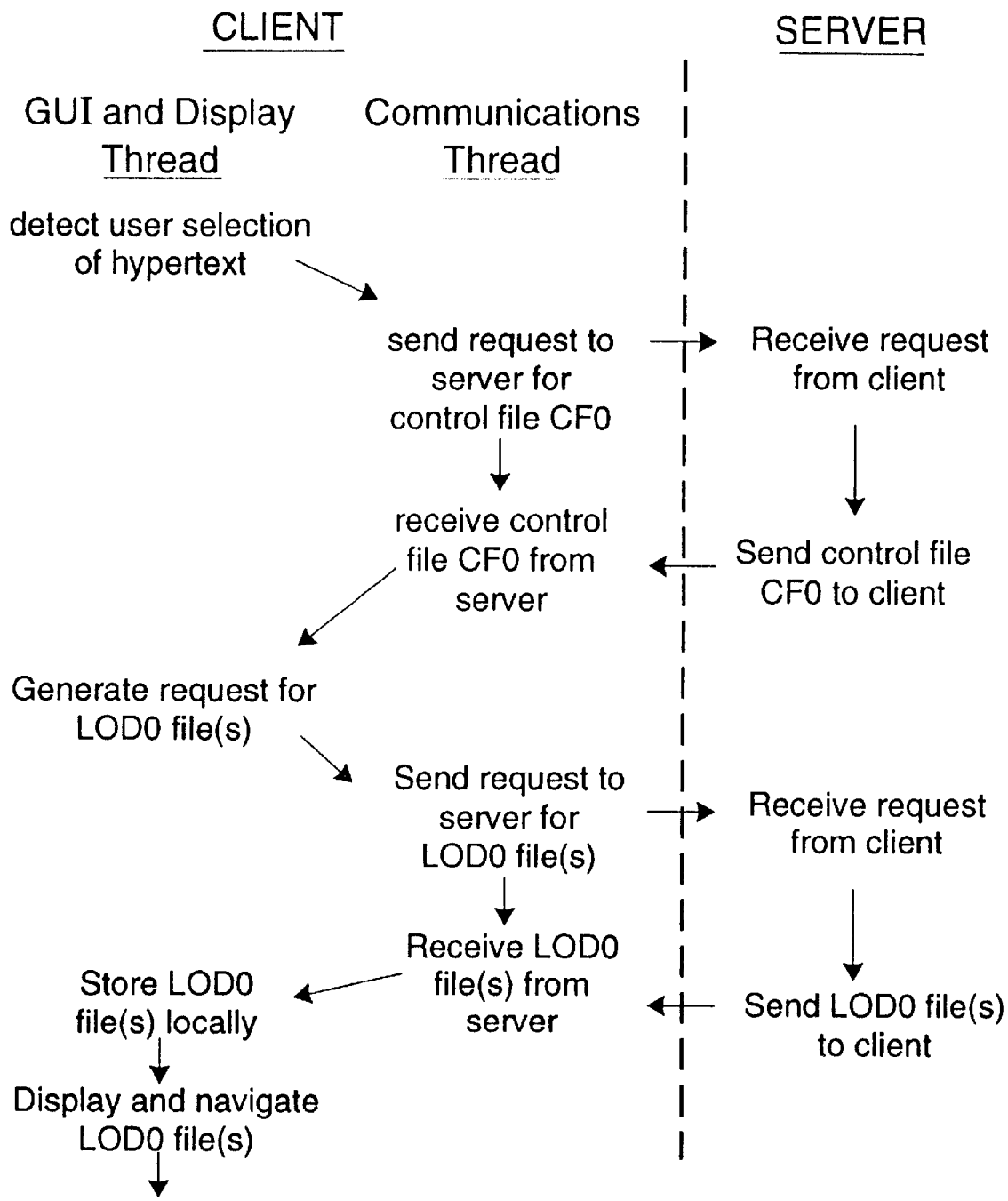
FIGS. 27(A)–(C) is a pictorial illustration of the operation of a client and server in manipulating a plurality of environment maps of progressively higher resolution stored on the server.
Figure 27:
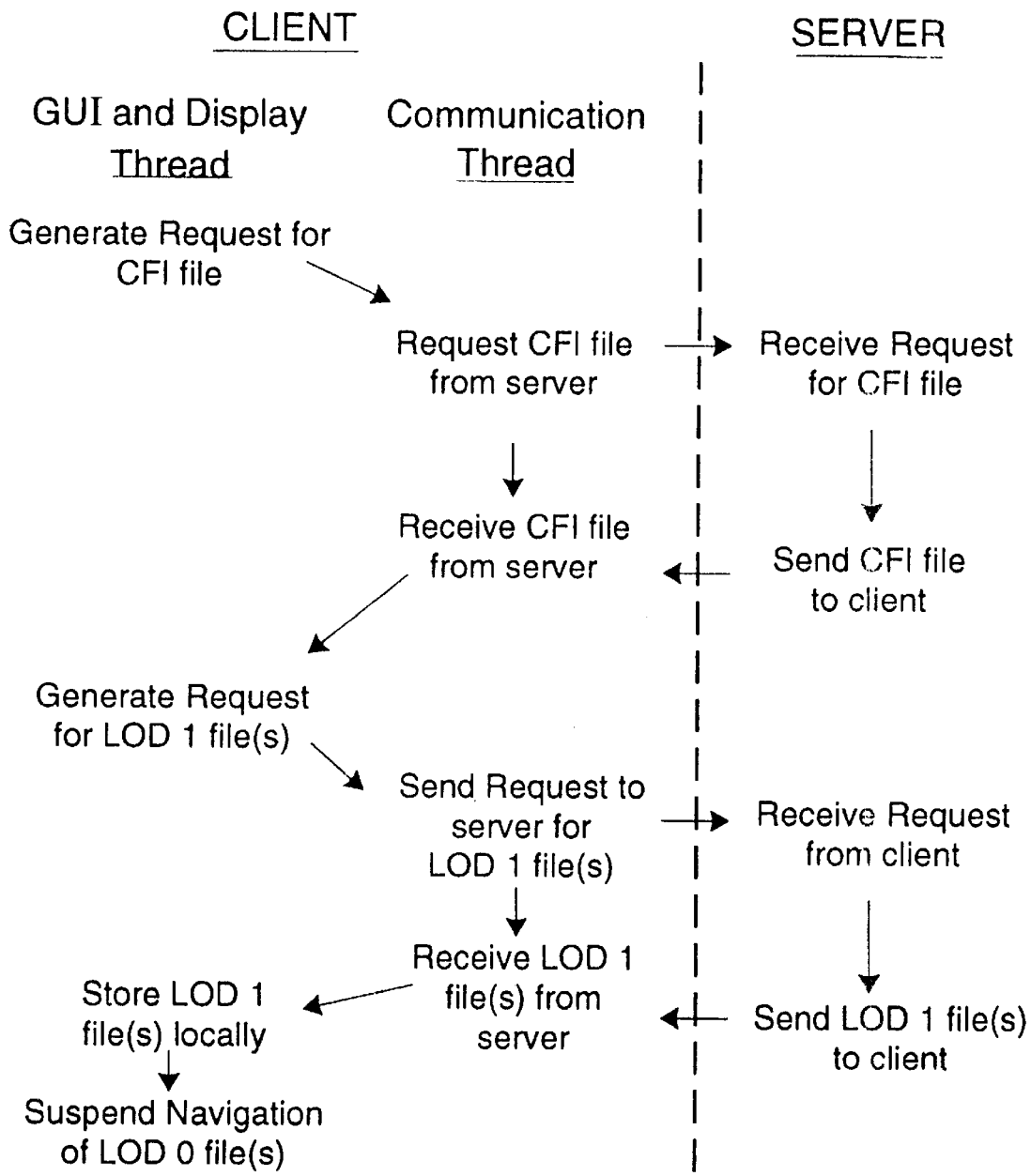
Figure 27C:
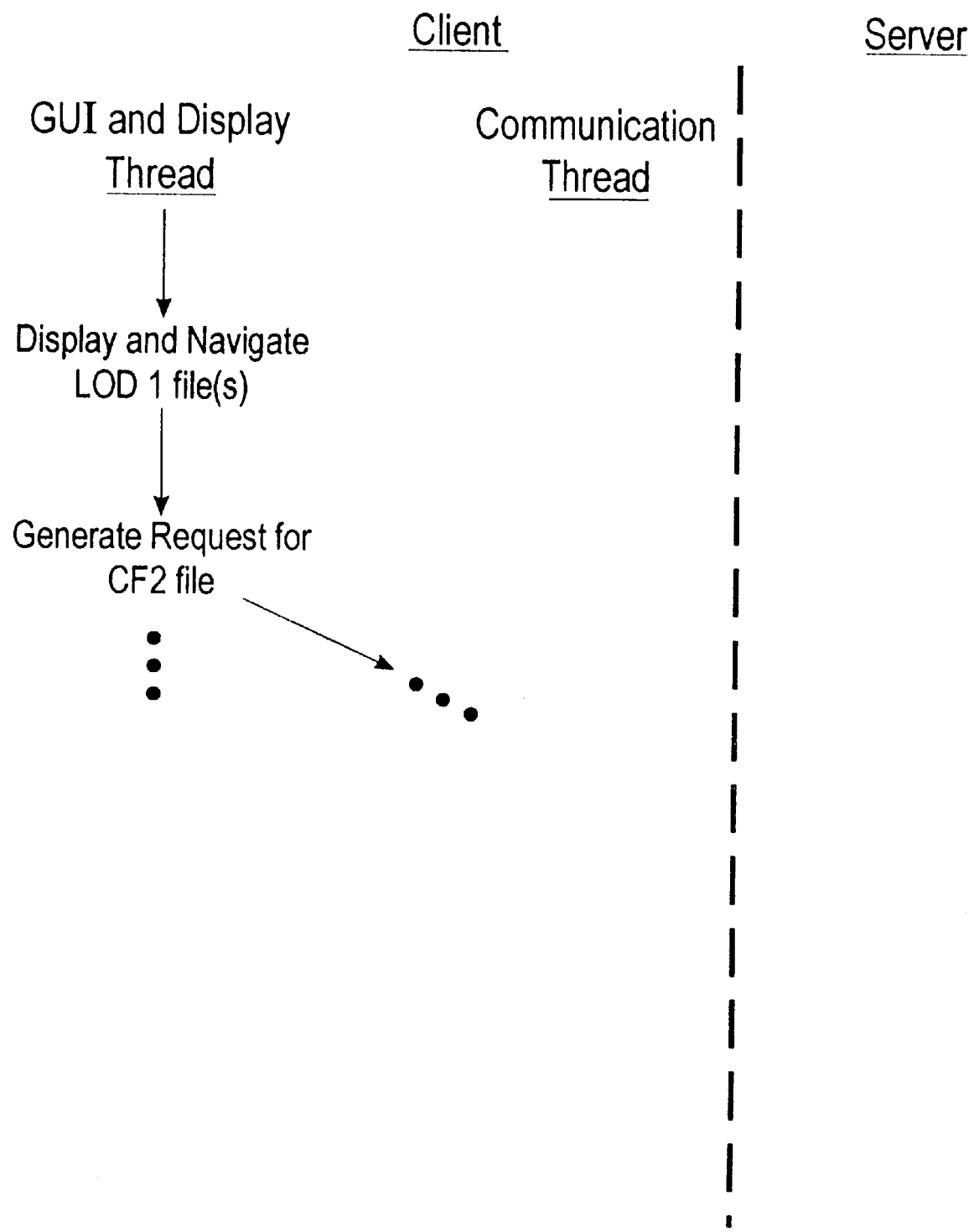

A more detailed description of the operation of the client and server in manipulating a plurality of environment maps having varying degrees of resolution is shown in FIGS. 27(A) and (B). In this example, the server stores a plurality of environment maps LOD0,LOD1,LOD2 . . . each having varying degrees of resolution. The lowest resolution environment map is designated LOD0. The environment maps LOD1,LOD2 . . . have progressively increasing resolution. Moreover, the operation of the client is partitioned into two threads, a display thread and a communication thread. However, the operation of the client is not limited in this respect and may be integrated into a single thread or into three or more threads.

The operation of the client begins when, for example, the user initiates a request to display the environment maps stored on the server. This request may be part of a hyperlink that identifies the server and a control file CF0 stored on the server. In this case, the control file CF0 preferably is used in conjunction with a plurality of other control files (CF1,CF2 . . . ) store on the server as a link list data structure to identify the chain of varying resolution environment maps to be downloaded from the server to the client. More specifically, the control file CF0 includes a pointer to the environment map LOD0 and a pointer to the control file CF1; the control file CF1 includes a pointer to the environment map LOD1 and a pointer to the control file CF2; etc.

In this case, the client requests the control file CF0 from the server in response to the user's request. Upon receiving the control file CF0 from the server, the client requests from the server the lowest resolution environment map LOD0 as identified in the control file CF0.

When the lowest resolution environment map LOD0 is received from the server, the client stores the lowest resolution environment map LOD0 locally, renders the lowest resolution environment map LOD0 for display and preferably allows the user to navigate within the lowest resolution environment map LOD0. In addition, the client requests the control file CF1 from the server. As described above, the control file CF1 preferably includes a pointer to the next higher resolution environment map LOD1 and the control file CF2 (if need be).

When the control file CF1 is received from the server, the client requests the next higher resolution environment map LOD1 from the server as identified in the control file CF1. When the next higher resolution environment map LOD1 is received from the server, the client stores the next highest resolution environment map LOD1 locally. In addition, the client suspends navigation of the lowest resolution environment map LOD0, renders the next highest resolution environment map LOD1 for display and preferably allows the user to navigate within the next highest resolution environment map LOD1. In addition, the client requests the control file CF2 from the server. As described above, the control file CF2 preferably includes a pointer to the next higher resolution environment map LOD2 and the control file CF3 (if need be).

When the control file CF2 is received from the server, the client requests the next higher resolution environment map LOD2 from the server as identified in the control file CF2. When the next higher resolution environment map LOD2 is received from the server, the client stores the next highest resolution environment map LOD2 locally. In addition, the client suspends navigation of the environment map LOD1, renders the next highest resolution environment map LOD2 for display and preferably allows the user to navigate within the next highest resolution environment map LOD2.

These operations may be repeated until the highest resolution environment map has been received by the client and rendered for display. This process provides for the user with the ability to quickly view and navigate through a lower resolution environment map while progressively building higher resolution environment maps, thus minimizing the effects of network communication delays.

Figure 28:
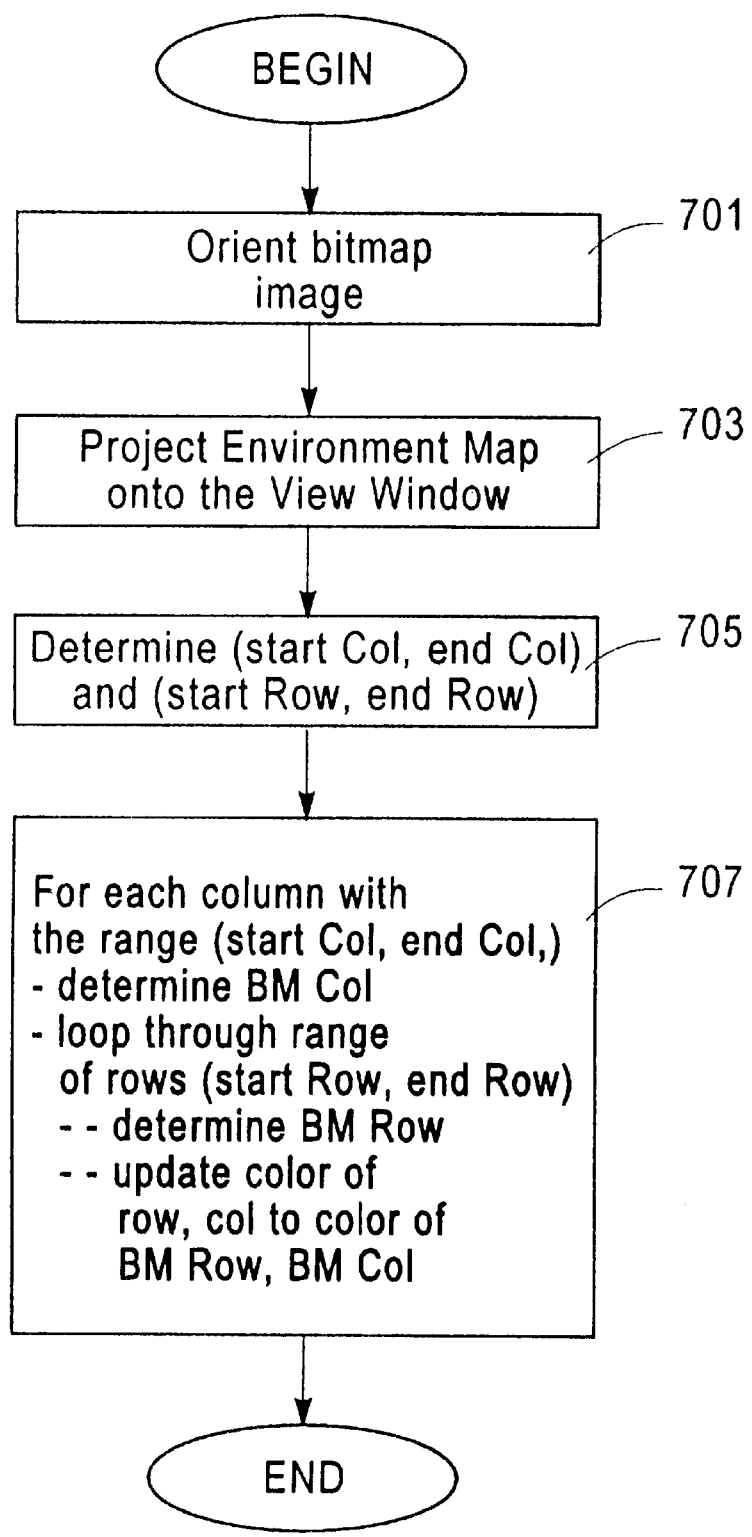
FIG. 28 is a flow chart illustrating operation of the system for rendering a bit map image and environment map according to the present invention.
Figure 29:
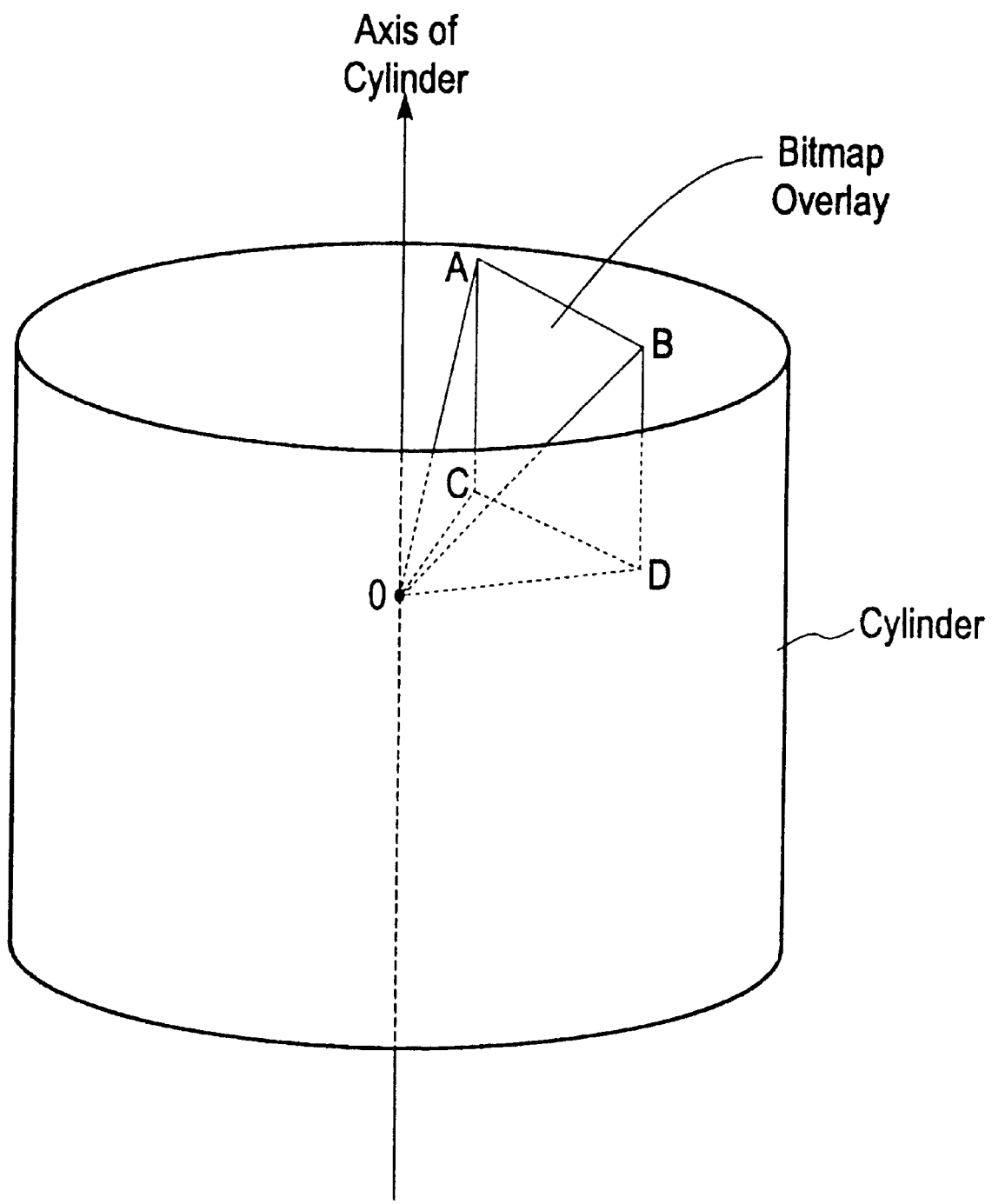
FIG. 29 is a pictorial illustration of the spacial relationship between a bit map image and a cylindrical environment map.
Figure 30:
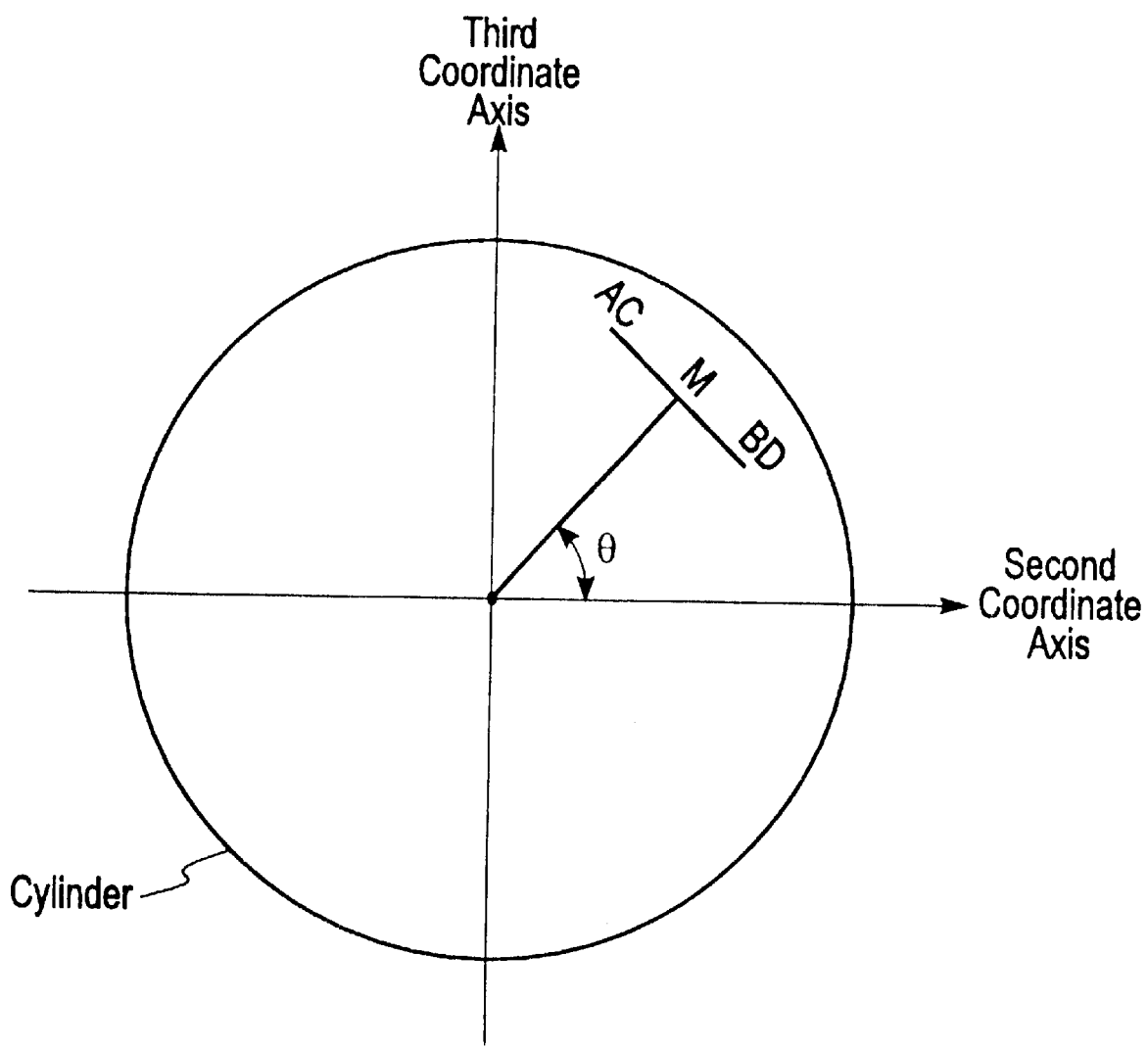
FIG. 30 is a top view of the cylindrical environment map looking down the axis of the cylinder illustrating the characteristic azimuth angle of the bit map image.
Figure 31:
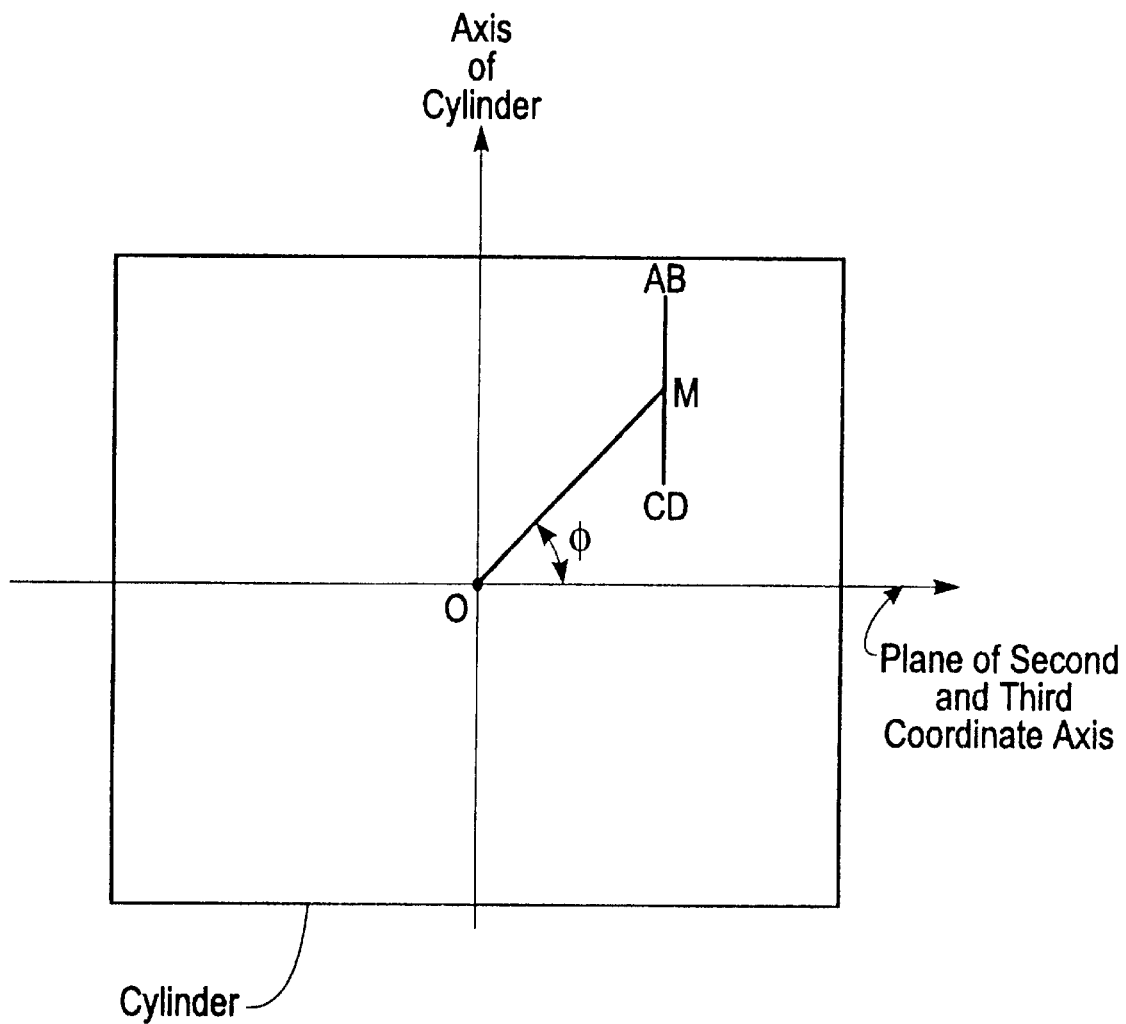
FIG. 31 is a view of the cylindrical environment map looking along the plane of the second and third axes of the cylinder illustrating the characteristic elevation angle of the bit map image.

In another aspect of the present invention, a mechanism is provided that allows one or more bit map images (or sprites) that are separate from the environment map to be integrated into a panoramic scene. A bit map image is a two dimensional array of pixels that represent the color of the image at each pixel. With reference to FIG. 28, the operation of integrating a bit map image into a panoramic scene begins in step 701 by orienting the bit map image within the coordinate system of the environment map. As shown in FIG. 2, the coordinate system of the cylindrical environment map is characterized by the axis of the cylinder and second and third axes that intersect the axis of the cylinder at the origin. The second and third axes are perpendicular to the axis of the cylinder and to one another. Preferably, the orientation of the bit map image is limited such that the bit map image lies in a plane which is parallel to the axis of the cylinder. In this case, the bit map image may be oriented within the coordinate system of the environment map by assigning to the bit map image a characteristic azimuth angle $\theta$ and elevation angle $\phi$. As shown in FIGS. 29 and 30, the azimuth angle $\theta$ is preferably represented by the angle between the plane of the second coordinate axis and the axis of the cylinder and the line that extends from the axis of the cylinder to the center pixel m of the bit map image. As shown in FIGS. 29 and 31, the elevation angle $\phi$ is preferably represented by the angle between a line that extends from the origin of the cylinder to the center pixel m of the bit map image and the plane of the second and third coordinate axes.

In step 703, the environment map is projected onto the view window as described above with respect to FIG. 25. The projection step results in the generation of the color values for the pixels of the rows and columns of the view window.

In step 705, the range of columns of the view window, designated by the pair (startCol,endCol), that are covered by the bit map image and the range of rows of the view window, designated by the pair (startRow,endRow), that are covered by the bit map image are determined.

In step 707, for each column icol within the range of columns (startCol,endCol), the column index BMCol of the bit map image that corresponds to the particular column icol of the view window is determined preferably as:

BMCol=icol−startCol

In addition, each row irow of the range of rows (startRow, EndRow) for the column (icol) of the view window is selected in succession and processed as follows. First, the row index BMRow of the bit map image that corresponds to the selected row irow of the view window is determined preferably as:

BMRow=irow−startRow

Second, the color value of the bit map image at the pixel identified by the indices BMRow,BMCol is substituted for the color value of the pixel of the view window identified by the indices (irow,icol), which was determined in step 703.

After processing the range of columns (startCol,endCol) of the view window that are covered by the bit map image, the operation ends.

The above processing allows for one or more bit map images that are separate from the environment map to be oriented and displayed in a panoramic scene.

In an alternate embodiment, the mechanism described above may be modified to enhance the integration of bit map images with the environment map by associating a depth value with the pixels of the bit map images. In this scenario, in step 701 a depth value is associated with the pixels of each bit map image. The depth value of the pixels of the depth map may be constant. Alternatively, the depth value may vary over the pixels of the bit map image. In this case, the depth value preferably represents the depth of the image with respect to the middle pixel. Thus, the depth of each pixel of the bit map image may be determined from characteristic azimuth angle $\theta$ and elevation angle $\phi$ of the bit map image and the relative depth of the pixel with respect to the center pixel that is associated with the given pixel. In addition, a default depth value (Dmax) is associated with the pixels of the environment map.

Preferably, a depth buffer is used to store the depth value associated with each pixel of the view window. The depth value for each of the pixels is initialized to a maximum value (Dmax). In step 703, the depth buffer is not accessed, thus the depth value of Dmax is assigned to pixels of the environment map projected onto the view window. In step 707, the depth value Dnew of the bit map image at the pixel (BMRow,BMCol) is compared to the depth value Bold stored in the location of the depth buffer corresponding to pixel (irow,icol) of the view window. If the depth value Dnew of the bit map image indicates that the bit map image is nearer to the view point than the stored depth value Bold, then the location of the depth buffer corresponding to the pixel (irow,icol) is updated to store the value Dnew, and the color value of the pixel of the view window identified by the indices (irow,icol) is overwritten with the color value of the bit map image at the pixel identified by the indices (BMRow, BMCol).

This processing provides for the display of the nearest bit map image when the bit map images partially (or completely) occlude one another.

In an alternate embodiment, the mechanism described above may be modified to enhance the integration of bit map images with the environment map by associating a depth value with the pixels of the bit map images and the pixels of the environment map. In this scenario, in step 701 a depth value is associated with the pixels of each bit map image. Preferably, the depth value represents the depth of the image with respect to the middle pixel. In this case, the depth of each pixel of the bit map image may be determined from characteristic azimuth angle $\theta$ and elevation angle $\phi$ of the bit map image and the relative depth of the pixel with respect to the center pixel that is associated with the given pixel. In addition, a depth value is associated with the pixels of the environment map. For example, in the case of a cylindrical environment map, the depth value associated with a given pixel of the environment map may be determined by the distance from the origin of the cylinder to the pixel on the cylinder. In another example, if the cylindrical environment map was derived from a rendering of a three dimensional scene, the depth value of the pixels of the environment map may be derived from the depth information of the objects of the scene.

A depth buffer may be used to store the depth value associated with each pixel of the view window. The depth value for each of the pixels of the view window is initialized to a maximum value (Dmax). In step 703, when the environment map is projected onto the view window as described above with respect to FIG. 25, the depth buffer is updated to store the depth value associated with the pixel of the environment map that covers the given pixel of the view window. The projection step also results in the generation of the color values for the pixels of the rows and columns of the view window. In step 707, the depth value Dnew of the bit map image at the pixel (BMRow,BMCol) is compared to the depth value Dold stored in the location of the depth buffer corresponding to pixel (irow,icol) of the view window. If the depth value Dnew of the bit map image indicates that the bit map image is nearer to the view point than the stored depth value Dold, then the location of the depth buffer corresponding to the pixel (irow,icol) is updated to store the value Dnew, and the color value of the pixel of the view window identified by the indices (irow,icol) is overwritten with the color value of the bit map image at the pixel identified by the indices (BMRow,BMCol).

This processing provides for the display of the bit map image or environment map when the bit map images and/or environment map partially (or completely) occlude one another.

In an alternative embodiment, the mechanism described above that associates a depth value with the pixels of the bit map images and the pixels of the environment map may be modified such that a depth buffer that stores a depth value corresponding to each pixel of the view window is not required. In this embodiment, in step 701 a depth value is associated with the pixels of each bit map image and a depth value is associated with the pixels of the environment map as described above. In step 703, when the environment map is projected onto the view window as described above with respect to FIG. 25, for each pixel of the view window identified by the indices (irow,icol), it is determined whether the pixel of the view window is covered by the bit map image.

If the view window is not partially covered by the bit map image, the processing continues as described above with respect to FIG. 25 such that the color value of the pixel (irow,icol) of the view window is set to the color value of the appropriate element of the environment map.

However, if the pixel of the view window is partially covered by the bit map image, then the row and column indices BMRow, BMCol of the bit map image that corresponds to the selected pixel (irow,icol) of the view window are determined. In addition, the depth value of the bit map image at the pixel (BMRow,BMCol) is compared to the depth value of the pixel of the environment map that corresponds to the pixel (irow,icol) of the view window. If the depth value of the pixel (BMRow,BMCol) of the bit map image indicates that the pixel (BMRow,BMCol) of the bit map image is nearer to the view point than the pixel of the environment map, then the color value of the pixel (irow, icol) of the view window is set to the color value of the bit map image at the pixel identified by the indices (BMRow, BMCol). Otherwise, the color value of the pixel (irow,icol) of the view window is set to the color value of the corresponding pixel of the environment map.

This processing provides for the display of the bit map image or environment map when the bit map images and/or environment map partially (or completely) occlude one another, and does not require a depth buffer that stores the depth information for the pixels of the view window.

In the embodiments set forth above that describe a mechanism that integrates a bit map image with an environment map in generating a panoramic scene, the orientation of the bit map images with respect to the environment map may be varied to provide for movement of such bit map images. Moreover, the bit map images may be selectively displayed to provide for image warping or other desired attributes. For example, consider four bit map images of a fish wherein each image represents the fish with its tail in a unique position. En this case, the fish may be made to appear to swim by coordinating the selection of the appropriate bit map image with a variation of the orientation of the displayed bit map image.

In addition, the position and/or orientation of the bit map images with respect to the environment map may be varied to provide for movement of such bit map images. Moreover, the bit map images may be selectively displayed to provide for image warping or other desired attributes. For example, consider four bit map images of a fish wherein each image represents the fish with its tail in a unique position. In this case, the fish may be made to appear to swim by coordinating the selection of the appropriate bit map image with a variation of the position of the displayed bit map image. In addition, a change in depth value of the bit map image may be represented by performing the appropriate scaling operation (scale up/scale down) on the bit map image. For example, if a bit map image is made to move closer (in depth) to the view point, a scale up (Zoom In) operation may be performed on the bit map image. However, if a bit map image is made to move further (in depth) from the view point, a scale down (Zoom Out) operation may be performed on the bit map image. In this scenario, the mapping between the view window and the bit map image would take into account the scaling operation of the bit map image.

The mechanisms described above provide for one or more bit map images to be integrated with an environment map when rendering a panoramic scene. The environment map may be a cylindrical environment map as described above. However, the mechanism is not limited in this respect, and may be used with any type of environment map. For example, the environment map may be a cube-faced environment map, a spherical environment map or a polyhedral environment map as set forth in U.S. patent application Ser. No. 60/022,428, incorporated by reference above in its entirety.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

In addition, the position and/or orientation of the bit map images with respect to the environment map may be varied to provide for movement of such bit map images. Moreover, the bit map images may be selectively displayed to provide for image warping or other desired attributes. For example, consider four bit map images of a fish wherein each image represents the fish with its tail in a unique position. In this case, the fish may be made to appear to swim by coordinating the selection of the appropriate bit map image with a variation of the position of the displayed bit map image. In addition, a change in depth value of the bit map image may be represented by performing the appropriate scaling operation (scale up/scale down) on the bit map image. For example, if a bit map image is made to move closer (in depth) to the view point, a scale up (Zoom In) operation may be performed on the bit map image. However, if a bit map image is made to move further (in depth) from the view point, a scale down (Zoom Out) operation may be performed on the bit map image. In this scenario, the mapping between the view window and the bit map image would take into account the scaling operation of the bit map image.

The mechanisms described above provide for one or more bit map images to be integrated with an environment map when rendering a panoramic scene. The environment map may be a cylindrical environment map as described above. However, the mechanism is not limited in this respect, and may be used with any type of environment map. For example, the environment map may be a cube-faced environment map, a spherical environment map or a polyhedral environment map as set forth in U.S. patent application Ser. No. 60/022,428, incorporated by reference above in its entirety.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. A method for generating a view of a scenes the method comprising the steps of:

storing in memory color values associated with elements of an environment map representing said scene;

storing in memory color values associated with elements of a bit map image that is separate from said environment map, said bit map image differing from said environmental map in viewing angle of said scene;

orienting said bit map image with respect to coordinate system of said environment map;

projecting said environment map onto a view window, wherein said view window comprises an array of pixels;

projecting said bit map image onto said view window; and for at least one pixel of said view window covered by said bit map image, determining at least one element of said bit map image that corresponds to said pixel of said view plane, and deriving a color value of said pixel based upon color value of said at least one element of said bit map image, and storing the derived color value of said pixel for display.

2. A method for generating a view of a scene, the method comprising the steps of:

storing in memory color values associated with elements of an environment map representing said scene;

storing in memory color values associated with elements of a bit map image that is separate from said environment map, said bit map image differing from said environmental map in viewing angle of said scene;

storing in memory depth values associated with elements of said bit map image;

orienting said bit map image with respect to coordinate system of said environment map;

projecting said environment map onto a view window wherein said view window comprises an array of pixels;

projecting said bit map image onto said view window; and for at least one pixel of said view window covered by said bit map image, determining at least one element of said bit map image that corresponds to said pixel of said view plane, if a depth value associated with said pixel and a depth value associated with said at least one element indicate that said at least one element is nearer to a view point than said pixel, deriving a color value of said pixel based upon color value of said at least one element of said bit map image, and storing the derived color value of said pixel for display.

3. The method of claim 2, wherein, for said at least one pixel of said view window covered by said bit map image, if said depth value associated with said pixel and said depth value associated with said at least one element indicate that said at least one element is further from said view point than said pixel, deriving a color value of said pixel based upon color value of at least one element of said environment map that corresponds to said pixel, and storing the derived color value of said pixel for display.

4. The method of claim 3, wherein depth values associated with said pixels of said view window are stored in a depth buffer.

5. The method of claim 4, wherein, for said at least one pixel of said view window covered by said bit map image, if said depth value associated with said pixel and said depth value associated with said at least one element indicate that said at least one element is nearer to a view point than said pixel, updating said depth value associated with said pixel of said view window according to said depth value associated with said at least one element of said bit map image.

6. The method of claim 2, further comprising the step of storing in memory depth values associated with said elements of said environment map, and wherein said depth value associated with said pixel of said view window is derived from a depth value associated with at least one element of said environment map that corresponds to said pixel of said view window.

7. A program storage device readable by a machine, tangibly embodying a program of instructions executable by the machine to perform method steps for generating a view of a scene, the method steps comprising:

storing in memory color values associated with elements of an environment map representing said scene;

storing in memory color values associated with elements of a bit map image that is separate from said environment map, said bit map image differing from said environmental map in viewing angle of said scene;

orienting said bit map image with respect to coordinate system of said environment map;

projecting said environment map onto a view window, wherein said view window comprises an array of pixels;

projecting said bit map image onto said view window; and for at least one pixel of said view window covered by said bit map image, determining at least one element of said bit map image that corresponds to said pixel of said view plane, and deriving a color value of said pixel based upon color value of said at least one element of said bit map image; and storing the derived color value of said pixel for display.

8. A program storage device readable by a machine, tangibly embodying a program of instructions executable by the machine to perform method steps for generating a view of a scene, the method comprising:

storing in memory color values associated with elements of an environment map representing said scene;

storing in memory color values associated with elements of a bit map image that is separate from said environment map, said bit map image differing from said environmental map in viewing angle of said scene;

storing in memory depth values associated with elements of said bit map image;

orienting said bit map image with respect to coordinate system of said environment map;

projecting said environment map onto a view window, wherein said view window comprises an array of pixels;

protecting said bit map image onto said view window; and for at least one pixel of said view window covered by said bit map image, determining at least one element of said bit map image that corresponds to said pixel of said view plane, if a depth value associated with said pixel and a depth value associated with said at least one element indicate that said at least one element is nearer to a view point than said pixel, deriving a color value of said pixel based upon color value of said at least one element of said bit map image; and storing the derived color value of said pixel for display.

9. The program storage device of claim 8, wherein, for said at least one pixel of said view window covered by said bit map image, if said depth value associated with said pixel and said depth value associated with said at least one element indicate that said at least one element is further from said view point than said pixel, deriving a color value of said pixel based upon color value of at least one element of said environment map that corresponds to said pixel, and storing the derived color value of said pixel for display.

10. The program storage device of claim 9, wherein depth values associated with said pixels of said view window are stored in memory.

11. The program storage device of claim 10, wherein, for said at least one pixel of said view window covered by said bit map image, if said depth value associated with said pixel and said depth value associated with said at least one element indicate that said at least one element is nearer to a view point than said pixel, updating said depth value associated with said pixel of said view window according to said depth value associated with said at least one element of said bit map image.

12. The program storage device of claim 8, further comprising the step of storing in memory depth values associated with said elements of said environment map, and wherein said depth value associated with said pixel of said view window is derived from a depth value associated with at least one element of said environment map that corresponds to said pixel of said view window.

* * * * *